United States Patent [19]
Franklin et al.

[11] Patent Number: 6,125,352
[45] Date of Patent: Sep. 26, 2000

[54] SYSTEM AND METHOD FOR CONDUCTING COMMERCE OVER A DISTRIBUTED NETWORK

[75] Inventors: D. Chase Franklin, Seattle; Darren B. Remington, Issaquah; Bassam Saliba; Bert Speelpenning, both of Kirkland; Michael Cockrill, Issaquah, all of Wash.

[73] Assignee: Microsoft Corporation, Redmond, Wash.

[21] Appl. No.: 08/748,688

[22] Filed: Nov. 13, 1996

Related U.S. Application Data

[60] Provisional application No. 60/020,891, Jun. 28, 1996.

[51] Int. Cl.$^7$ ................................................. G06F 17/60
[52] U.S. Cl. ............................. 705/26; 705/27; 709/217; 709/218; 709/219
[58] Field of Search .............................. 705/26, 27, 16, 705/17, 18, 1; 380/24, 25; 235/383; 340/825.35; 395/200.47, 200.48, 200.49; 709/218, 219, 217

[56] References Cited

U.S. PATENT DOCUMENTS

| | | | |
|---|---|---|---|
| 4,799,156 | 1/1989 | Shavit et al. | 364/401 |
| 4,992,940 | 2/1991 | Dworkin | 364/401 |
| 5,469,206 | 11/1995 | Strubbe et al. | 348/7 |
| 5,590,197 | 12/1996 | Chen et al. | 380/24 |
| 5,640,193 | 6/1997 | Wellner | 348/7 |
| 5,664,110 | 9/1997 | Green et al. | 705/26 |
| 5,664,115 | 9/1997 | Fraser | 705/37 |
| 5,671,279 | 9/1997 | Elgamal | 380/23 |
| 5,677,955 | 10/1997 | Doggett et al. | 380/24 |
| 5,710,887 | 1/1998 | Chelliah et al. | 705/26 |
| 5,721,832 | 2/1998 | Westrope et al. | 705/27 |
| 5,744,787 | 4/1998 | Teicher | 235/380 |
| 5,757,917 | 5/1998 | Rose et al. | 380/25 |
| 5,850,446 | 12/1998 | Berger et al. | 380/24 |
| 5,918,213 | 6/1999 | Bernard et al. | 705/26 |
| 5,956,483 | 9/1999 | Grate et al. | 709/203 |

OTHER PUBLICATIONS

General overview and description of eShop Technology, Internet address: http://www.eshop.com/corp/technology.html. This reference was copied from the Internet and printed around May, 1996, although the pages are dated Jan. 1, 1996.

A compilation of press releases of various dates describing features of eShop Technology, Internet address: http://www.eshop.com/corp/press.html. This reference was copied from Internet and printed around May, 1996, although the pages are dated Jan. 1, 1996. Also note dates listed for press release of Nov. 7, 1995, Dec. 7, 1995, and Jan. 23, 1996.

*Primary Examiner*—Edward R. Cosimano
*Attorney, Agent, or Firm*—Lee & Hayes, PLLC

[57] ABSTRACT

A system and method for conducting commerce over a distributed network manage merchant and product information in an electronic shopping basket, payment source information in an electronic wallet, and shipping address information in an electronic address book, all of such information being stored on a consumer computer. A commerce client running on the consumer computer is configured as a MIME handler and extends the functionality of a standard Web browser to support computer-based shopping. A merchant site Web server provides HTML-coded Web documents which describe merchant products and which host computer-based shopping options. The HTML-coded Web documents contain function-calling information by which consumer-selected options invoke shopping-related functions on either the merchant (server) computer or the consumer (client) computer. A consumer selects the options from within the Web browser to initiate shopping-related operations such as: retrieve product information from merchants on the World Wide Web, selectively store product information locally on the consumer computer, locally compare product information from different merchants, locally store payment source and shipping address information and selectively forward such information to merchant sites, order products from Web-based merchants, track the status of purchase orders, and receive instructional information on application usage.

25 Claims, 12 Drawing Sheets

SYSTEM AND METHOD FOR CONDUCTING COMMERCE OVER A DISTRIBUTED NETWORK

PRIORITY

This application claims priority from the provisional patent application No. 60/020,891 mailed Jun. 28, 1996, titled, "SYSTEM AND METHOD FOR CONDUCTING COMMERCE OVER A DISTRIBUTED NETWORK."

BACKGROUND OF THE INVENTION

1. Field of the Invention

This invention relates to distributed computer networks such as the Internet. More particularly, this invention relates to client-server software components for allowing consumers to purchase goods and services from merchants over a distributed network.

2. Description of the Related Art

Electronic shopping systems currently exist which allow users to remotely purchase goods and services from a variety of different on-line merchants over a distributed computer network such as the Internet. With systems of this type, the on-line merchants typically publish on-line catalogs which can be viewed interactively by the end users of the network using a personal computer. These catalogs include pictures, textual descriptions, and pricing information with respect to the products and/or services of the respective merchants, and typically include on-line forms for allowing users to return purchase orders to the merchants over the network. In World Wide Web ("Web") based implementations, the on-line catalogs are in the form of hypertext documents which are hosted by the Web sites of the respective merchants, and the catalogs are accessed using a standard Web browser application which runs on the user computer. (A Web site is an Internet-connected computer or computer system which runs server software for serving information using the standard protocols of the World Wide Web.) In other implementations, the on-line catalogs may, for example, be hosted by a centralized computer of an on-line services network, such as MSN™, or by an Internet site which is accessed using a proprietary client application (such as the client application of eShop Inc.).

SUMMARY OF THE INVENTION

Some computer-based shopping systems currently exist which allow the user to selectively store product information (and various other types of "shopping-state" information) for subsequent recall and use. This allows the user to rapidly bring up the information viewed during previous visits to the merchant site, and to essentially continue the shopping session where the user left off. Unfortunately, these systems generally store the product information on the server side only (e.g., on the merchant Web site), and do not include the necessary client and server software components for allowing the user to selectively store the product information on the consumer computer. This deficiency in the software architectures of existing computer-based shopping systems imposes several limitations on consumers. First, it makes it difficult for the consumer to gather product information from multiple merchants into a common, local storage area. This, in turn, makes comparison shopping very difficult: the consumer generally cannot, without considerable inconvenience, compare like products (or services) from different on-line merchants. Second, because the information is typically retained by the merchant site for a limited period of time (typically a few days), the consumer is under a time constraint to make use of the stored product information. Moreover, many hundreds or thousands of requests by consumers to store product information on a merchant's site may degrade the merchant site's response time, and create other problems related to the heavy storage burden.

Also, because existing computer-based shopping systems typically host most or all transaction options on the server side, the shopping experience often differs from merchant site to merchant site. Specifically, as the consumer moves from one merchant site to the next, the options presented to the consumer and the steps required to navigate and effectively use those options often differ significantly. Thus, to browse product information and purchase products and/or services offered by multiple merchants, consumers often must adapt to and learn the options offered by each merchant site.

Another problem with existing computer-based shopping systems is that they often require user entry of purchase information and shipping information upon every purchase, or at least require consumers to identify themselves during each shopping session. These restrictions are time consuming, tedious, and bothersome. Further, repeated entry of payment information or shipping information increases the likelihood that a consumer will mistakenly enter incorrect information.

The present invention addresses these and other problems with existing electronic shopping systems. In accordance with the invention, an electronic shopping system is provided which makes use of the existing client and server software components and protocols of the World Wide Web, and which adds various client-side functionality for allowing users to store, view, and process product information (gathered from merchant Web sites), payment information, and shipping information on the user computer. The system includes a specialized client application (referred to as the "commerce client") which runs on the consumer computer in conjunction with a standard Web browser. The commerce client communicates with a specialized commerce server (which runs on the merchant Web site in conjunction with a Web server) using a bi-directional function calling protocol. Hypertext (HTML) catalog pages served by the merchant Web site, as well as "user interface" hypertext documents stored on the user computer, include embedded function calls which can be selectively invoked by the consumer while viewing the hypertext pages with the Web browser. Using these embedded function calls, the user can perform actions such as: request pricing or inventory information on a particular product from the merchant Web site; selectively store product information within a client-side shopping basket; view the contents of the shopping basket; and transmit encrypted shipping and/or payment information (stored on the consumer computer) to the merchant Web site.

In accordance with one aspect of the invention, there is thus provided a method for gathering and comparing product information over a distributed network. The method comprises the steps of (a) sending a first hypertext document over the distributed network to a user computer, the first hypertext document comprising a description of (i) a first product, (ii) a selectable product gathering option, and (iii) function-calling information associated with the product gathering option; (b) displaying the first hypertext document to a user via the user computer and monitoring user input for selection of the product gathering option; and (c) responding to selection of the product gathering option by calling an executable function specified by the function-calling information, the function storing the description of the first product to a data storage area accessible to the user computer. Another embodiment of this aspect preferably comprises the further steps: (d) sending a second hypertext document over the distributed network to the user computer, the second hypertext document comprising (i) a description of a second product, (ii) a selectable product gathering option, and (iii) function-calling information associated with the product gathering option; (e) displaying the second hypertext document to the user via the user computer and monitoring user input for selection of the product gathering option; (f) responding to selection of the product gathering option by calling a second executable function represented in the function-calling information, the function storing the description of the second product to the data storage area; (g) displaying a product comparison option to the user via the user computer and monitoring user input for selection of the product comparison option; and (h) responding to selection of the product comparison option by retrieving from the local storage area the description of the first product and the description of the second product, and by formatting the descriptions and displaying the descriptions to the user via the user computer.

Another aspect of the present invention is a method for using a Web browser to manage local data. The local data is stored on a computer storage medium accessible to the user computer. The method comprises the steps of: (a) receiving with the Web browser an HTML document (HyperText Markup Language) comprising a user-selectable view option and function-calling information associated with the view option; (b) displaying the HTML document to a user via the user computer, the display including the view option; (c) monitoring user input for selection of the view option; and (d) responding to selection of the view option by calling a function represented in the function-calling information, the function accessing and formatting the local data and displaying the local data to the user.

BRIEF DESCRIPTION OF THE DRAWINGS

These and other features of the invention are described below with reference to the drawings of a preferred embodiment of a computer-based shopping system, which is intended to illustrate and not to limit the invention, and in which.

DETAILED DESCRIPTION OF THE PREFERRED EMBODIMENT

Figure 1:
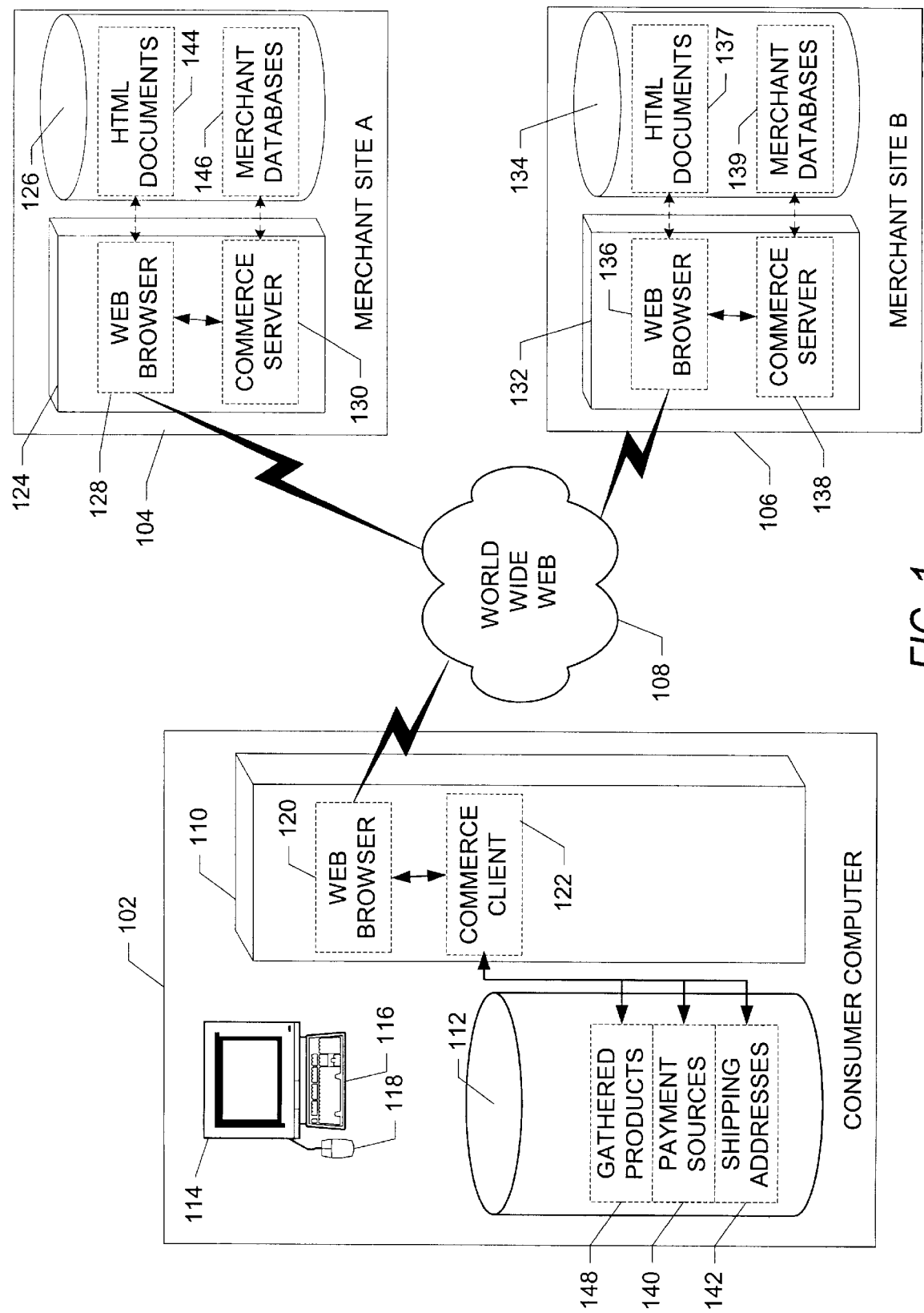
FIG. 1 illustrates a consumer computer communicating with two merchant Web sites of the system in accordance with the present invention.

The present invention concerns electronic shopping and provides the ability to use a personal computer to compare and purchase products offered for sale via a distributed network. The invention is embodied within a computer-based shopping system which utilizes the existing protocols and components of the World Wide Web. The computer-based shopping system is described in detail herein.

In the preferred embodiment, the system includes a "commerce client" process which runs on a consumer's computer in conjunction with a standard Web browser. The commerce client communicates over the Internet with a "commerce server" (using a bi-directional function calling protocol) executing on a merchant Web site. In a preferred embodiment, the commerce client includes functionality similar to that of a shopping basket, a wallet, and an address book, and the commerce server includes functionality for providing a variety of commerce-related services (such as accessing or returning product information, calculating taxes, processing orders, etc.).

The commerce client and commerce server operate together to allow a consumer to gather product information from any number of merchants while the consumer's computer is connected to the Internet. The commerce client also permits the consumer to perform comparison shopping by reviewing product information gathered from various merchants. This product comparison can be performed by the consumer at any time (e.g., while off-line) and over any length of time, regardless of whether the consumer's computer is connected to the Internet.

A user unfamiliar with the operation of a computer-based shopping system which embodies the present invention can access instructional information (or application help) by selecting a help option. The instructional information is stored on one or more HTML-coded Web documents which are retrieved and displayed according to the user's needs.

A computer-based shopping system embodying the present invention permits a user to purchase products from an on-line merchant. The consumer uses the commerce client to authorize payment, select a payment source, select a shipping address (none of which require network connection) and also to place an order to the merchant for the selected product. A network connection is established for the commerce client to communicate the order to the commerce server. The payment and shipping information is protected from third party discovery using encryption technology.

The following sections and subsections describe the invention in more detail:

A. Glossary of Terms and Acronyms

B. Example Computer-Based Shopping Session

C. Communication Between Commerce Client and Commerce Server

D. Software Architecture of Merchant Web Site

E. Software Architecture of Consumer Computer

A. Glossary of Terms and Acronyms

The following terms and acronyms are used throughout the detailed description:

Internet.

A collection of interconnected (public and/or private) networks that are linked together by a set of standard protocols (such as TCP/IP and HTTP) to form a global, distributed network. (While this term is intended to refer to what is now commonly known as the Internet, it is also intended to encompass variations which may be made in the future, including changes and additions to existing standard protocols.)

World Wide Web ("Web").

Used herein to refer generally to both (i) a distributed collection of interlinked, user-viewable hypertext documents (commonly referred to as "Web documents" or "Web pages") that are accessible via the Internet, and (ii) the client and server software components which provide user access to such documents using standardized Internet protocols. Currently, the primary standard protocol for allowing applications to locate and acquire Web documents is HTTP (discussed below), and the Web pages are encoded using HTML (also discussed below). However, the terms "Web" and "World Wide Web" are intended to encompass future markup languages and transport protocols which may be used in place of (or in addition to) HTML and HTTP.

Client-Server.

A model of interaction in a distributed system in which a program at one site sends a request to a program at another site and waits for a response. The requesting program is called the "client," and the program which responds to the request is called the "server." In the context of the World Wide Web, the client is a "Web browser" (or simply "browser") which runs on a computer of a user; the program which responds to browser requests by serving Web pages is commonly referred to as a "Web server."

TCP/IP (Transmission Control Protocol/Internet Protocol).

A standard Internet protocol (or set of protocols) which specifies how two computers exchange data over the Internet. TCP/IP handles issues such as packetization, packet addressing, handshaking and error correction. For more information on TCP/IP, see Volumes I, II and III of Comer and Stevens, *Internetworking with TCP/IP*, Prentice Hall, Inc., ISBNs 0-13-468505-9 (vol. I), 0-13-125527-4 (vol. II), and 0-13-474222-2 (vol. III).

HTML (HyperText Markup Language).

A standard coding convention and set of codes for attaching presentation and linking attributes to informational content within documents. (HTML 2.0 is currently the primary standard used for generating Web documents.) During a document authoring stage, the HTML codes (referred to as "tags") are embedded within the informational content of the document. When the Web document (or "HTML document") is subsequently transferred from a Web server to a browser, the codes are interpreted by the browser and used to parse and display the document. In addition to specifying how the Web browser is to display the document, HTML tags can be used to create links to other Web documents (commonly referred to as "hyperlinks"). For more information on HTML, see Ian S. Graham, *The HTML Source Book*, John Wiley and Sons, Inc., 1995 (ISBN 0471-11894-4).

Port or Port Number.

(Also referred to as "socket number.") In the context of the Internet, a numerical identifier (normally provided in conjunction with an IP address) which is used by TCP/IP to direct incoming data to a particular application. Certain ports have been reserved by the Internet Assigned Number Authority (IANA) for certain applications. For example, port 80 is reserved for HTTP, and is used on Web sites to direct incoming traffic to a Web server. (See "URL" below.)

URL (Uniform Resource Locator).

A unique address which fully specifies the location of a file or other resource on the Internet. The general format of a URL is protocol://machine address:port/path/filename. The port specification is optional, and if none is entered by the user, the browser defaults to the standard port for whatever service is specified as the protocol. For example, if HTTP is specified as the protocol, the browser will use the HTTP default port of 80.

HTTP (Hypertext Transport Protocol).

The standard World Wide Web client-server protocol used for the exchange of information (such as HTML documents, and client requests for such documents) between a browser and a Web server. HTTP includes a number of different types of messages which can be sent from the client to the server to request different types of server actions. For example, a "GET" message, which has the format GET <URL>, causes the server to return the document or file located at the specified URL.

HTTP POST.

A type of HTTP message which is used to request that the Web server accept information from the Web client. This information may, for example, be in the form of a message to be posted to a newsgroup, or a database submission which is executed by a CGI script. (See "CGI" below.)

MIME (Multipurpose Internet Multimedia Extensions) Type.

A file extension or attachment which specifies the type or format of the file (e.g., HTML, text, graphics, audio, etc.). MIME typing allows the Web browser to determine how to process a file that is received from a Web server. For example, a file of MIME type HTML (extension ".htm" or ".html") will be displayed by the browser, while a file of MIME type X-WAV (extension ".wav") will typically be passed to an audio player which can handle the Microsoft WAV format. Standard Web browsers come pre-configured to handle popular MIME types. In addition, standard Web browsers can easily be configured by the user to handle new MIME types; this typically involves specifying the file extension of each new MIME type, and specifying the path and filename of the application (referred to as a "MIME handler") to which files of such type should be passed.

Internet Firewall.

A security system placed between the Internet and an organization's network (such as a LAN) to provide a barrier against security attacks. Internet firewalls typically operate by monitoring incoming and/or outgoing traffic to/from the organization's network, and by allowing only certain types of messages to pass. For example, a firewall may be configured to allow the passage of all TCP/IP traffic addressed to port 80, and to block all other traffic. For more information of Internet Firewalls, see Chapman and Zwicky, *Building Internet Firewalls*, O'Reilly publishing, 1995 (ISBN 1-56592-124-0).

CGI (Common Gateway Interface).

A standard interface which specifies how a Web server (or possibly another information server) launches and interacts with external programs (such as a database search engine) in response to requests from clients. With CGI, the Web server can serve information which is stored in a format that is not readable by the client, and present such information in the form of a client-readable Web page. A CGI program (called a "CGI script") may be invoked, for example, when a Web user fills out an on-screen form which specifies a database query. One disadvantage of CGI is that it generally requires the launching of a separate process for each client request received. For more information on CGI, see Ian S. Graham, *The HTML Source Book*, John Wiley and Sons, Inc., 1995 (ISBN 0471-11894-4), pp. 231–278.

ISAPI (Internet Server Application Program Interface).

Microsoft's interface for allowing a Web server (or other information server) to launch and interact with external programs in response to requests from clients. ISAPI programs are in the form of dynamic link libraries (DLLs) which run in the same process space as the Web server. Thus, ISAPI performs a similar function to that of CGI, but without requiring the launching of a separate process. Documentation on ISAPI is available from Microsoft Corporation as part of the Microsoft Internet Information Server Software Development kit.

B. Example Computer-Based Shopping Session

This section provides an illustration of a hypothetical computer-based shopping session wherein features of the present invention are used. FIG. 1 illustrates a consumer computer 102, a first merchant site ("merchant site A") 104, and a second merchant site ("merchant site B") 106, each connected to the Internet and utilizing the World Wide Web ("WWW") 108. Merchant site A 104 and merchant site B 106 host shopping-oriented transactions to advertise and sell products over the Internet. The consumer computer 102 and merchant Web sites 104, 106 run client and server software applications which allow a consumer to browse product information advertised over the WWW, gather information about products and merchants, selectively store the product and merchant information in a client side database, compare product information from different merchants, and purchase products sold over the Internet.

The consumer computer 102 comprises a processing unit 110, a data storage area 112, as well as a monitor 114, keyboard 116, and a mouse 118. A standard Web browser 120 (such as, for example, Microsoft Internet Explorer 2.0 or Netscape Navigator 2.0) and a specialized commerce client process 122 execute on the processing unit 110.

Merchant site A 104 comprises a processing unit 124 and a data storage area 126 which stores HTML documents 144 and merchant databases 146. A standard Web server 128 (such as Microsoft Internet Information Server 1.0) and a specialized commerce server 130 execute on the processing unit 124. Likewise, merchant site B comprises a processing unit 132 and a data storage area 134 which stores HTML documents 137 and merchant databases 139. A standard Web browser 136 executes on the processing unit 132, as does a specialized commerce server 138.

A consumer using the consumer computer 102 stores payment source information 140 such as a credit card number, expiration date, and issuing bank to the storage area 112. The consumer supplies a password in association with the payment source information. The password is used not only to prevent future unauthorized accesses, but also to encrypt the payment source information. The payment source information represents preferred sources of cash and/or credit for purchasing products and/or services. The commerce client 122 writes encrypted payment source data to the data storage area 112. After entering the payment source information once and verifying its accuracy, the information persists on the consumer computer 102 without requiring re-entry by the consumer. The consumer designates one of the payment sources stored as the preferred payment source.

The consumer also stores shipping address information 142 to the storage area 112 via the consumer computer 102. Shipping address information indicates preferred destinations for delivery of products and includes, for example, a personal residence address, a P.O. Box, or a business address. Again, the commerce client 122 writes shipping address information 142 entered by the consumer to the storage area 112. After the preferred shipping destinations are entered, they need not be entered a second time. As done with the payment source data, the consumer designates one shipping address as the preferred shipping address.

A consumer uses the consumer computer 102 to shop for products such as, for example, an audio compact disc, a downloadable software program, a rare con, or a refrigerator, offered by merchants via the World Wide Web 108. Using the example of shopping for a refrigerator, the consumer uses the consumer computer 102 to establish a connection to the Internet and uses a Web browser to navigate World Wide Web 108 sites. Connecting to the Internet and browsing the WWW is well known and the steps involved will not be further described.

The consumer uses the Web browser 120 to access a merchant site A 104 on the WWW. The Web server 128 of merchant site A 104 responds to the access initiated by the consumer computer 102 by retrieving a first HTML document (i.e., a collection of data encoded in compliance with the Hyper-Text Markup Language) from the set of HTML documents 144, and by then transmitting the first HTML document to the Web browser 120 of the consumer computer 102.

The Web browser 120 interprets the HTML document and creates on the monitor 114 a page-oriented representation of the document. The consumer views the document on the monitor 114. The document may, for example, present textual information to the consumer describing merchant site A 104 such as the nature of products offered and the forms of payment accepted in filling orders for the products. The consumer may, for example, discover that merchant site A offers refrigerators for sale and accepts VISA for payment.

Generally, consumer-selectable options ("hypertext links") are also presented within the HTML document which, if selected by a consumer using the mouse 118 or the keyboard 116, cause the consumer computer 102 to transmit requests to the Web server 128 to retrieve and transmit additional HTML documents providing related or more detailed information. The consumer navigates additional hypertext links and browses additional HTML documents summarizing features of refrigerators sold by merchant site A.

The consumer decides that one of the refrigerators offered by merchant site A is well-suited to the consumer's needs. A number of attributes are presented to the consumer, each attribute capable of being set to one of a number of values. Thus, for example, the user sets a color attribute to "Egg Shell White," sets an indoor water spout attribute to "No," and an automatic ice-maker attribute to "Yes." The consumer then selects an option labeled, for example, "Add Item to Shopping Basket." The Web browser 120 directs a corresponding message to the commerce client 122 causing information about the selected merchant A refrigerator, including the attributes selected, to be stored in a gathered products database 148. (The protocols and software components which enable this type of operation to be performed are described in the following sections.) Such information includes, for example, a picture of the refrigerator, cubic foot capacity, temperature range, energy usage, manufacturer's warranty, price, the attributes set by the consumer, the URL of merchant site A, and also includes a preferred payment source and a preferred shipping address. The consumer then ends the shopping session with merchant site A either by accessing a different World Wide Web site or by directing the consumer computer 102 to terminate the network connection to the Internet.

Two days later, the consumer, again having time to shop, directs the consumer computer 102 to connect to merchant site B via the World Wide Web. Merchant site B also offers refrigerators for sale. After navigating through HTML documents describing the features of the refrigerators sold by merchant site B, the consumer selects a refrigerator, sets the refrigerator attributes as desired, and invokes the "Add Item to Shopping Basket" option. The commands to accomplish this are the same as those required to add the information about the merchant site A refrigerator to the shopping basket. The commerce client 122 responds to the invoked option by adding information about the merchant site B refrigerator to the gathered products database 148. The consumer then terminates the shopping session with merchant site B 106.

Three weeks later, the consumer uses the consumer computer 102 to compare the information about the merchant site A refrigerator and the merchant site B refrigerator. The consumer does not need to connect to the World Wide Web to compare the two refrigerators. The consumer invokes an option entitled, for example, "View Items in Shopping Basket." The commerce client 122 extracts the information about the two refrigerators from the gathered products information 148, and formats the information such that the consumer can view it on the monitor 114. After weighing the features, warranties, and prices of the two refrigerators, the consumer decides to purchase the merchant site A refrigerator.

The consumer then authorizes access to the payment source and address information stored on the consumer computer by entering a password known only to the consumer. After the consumer enters the password, the commerce client 122 accesses the payment source information 140, decrypts the information, combines it with information about the merchant A refrigerator to assemble a goods and services order ("GSO"). The GSO is then encrypted and included as part of an HTTP POST message which is sent to the URL of merchant A. Merchant A receives the message, decrypts it, processes the order, and ships the product to the consumer's specified shipping address.

A few years after purchasing the refrigerator, the consumer examines a product purchasing history to determine, for example, whether the refrigerator is still under warranty. The electronic shopping basket retains a complete, browsable history of all products purchased.

C. Communication Between Commerce Client and Commerce Server

The present invention extends the functionality of the standard Web browser 120 by adding shopping-related features, namely, a shopping basket in which product information can be gathered, a wallet in which sources of payment can be stored, and an address book in which shipping addresses can be recorded. The standard Web browser 120, so extended, offers consumers an extremely convenient and consistent method of shopping for products over the World Wide Web. This section describes a method for a Web browser to call functions on both its own local computer and also on a computer executing a Web server. Additionally, a method is described for allowing a Web server to call functions on a computer executing a Web browser.

Figure 2:
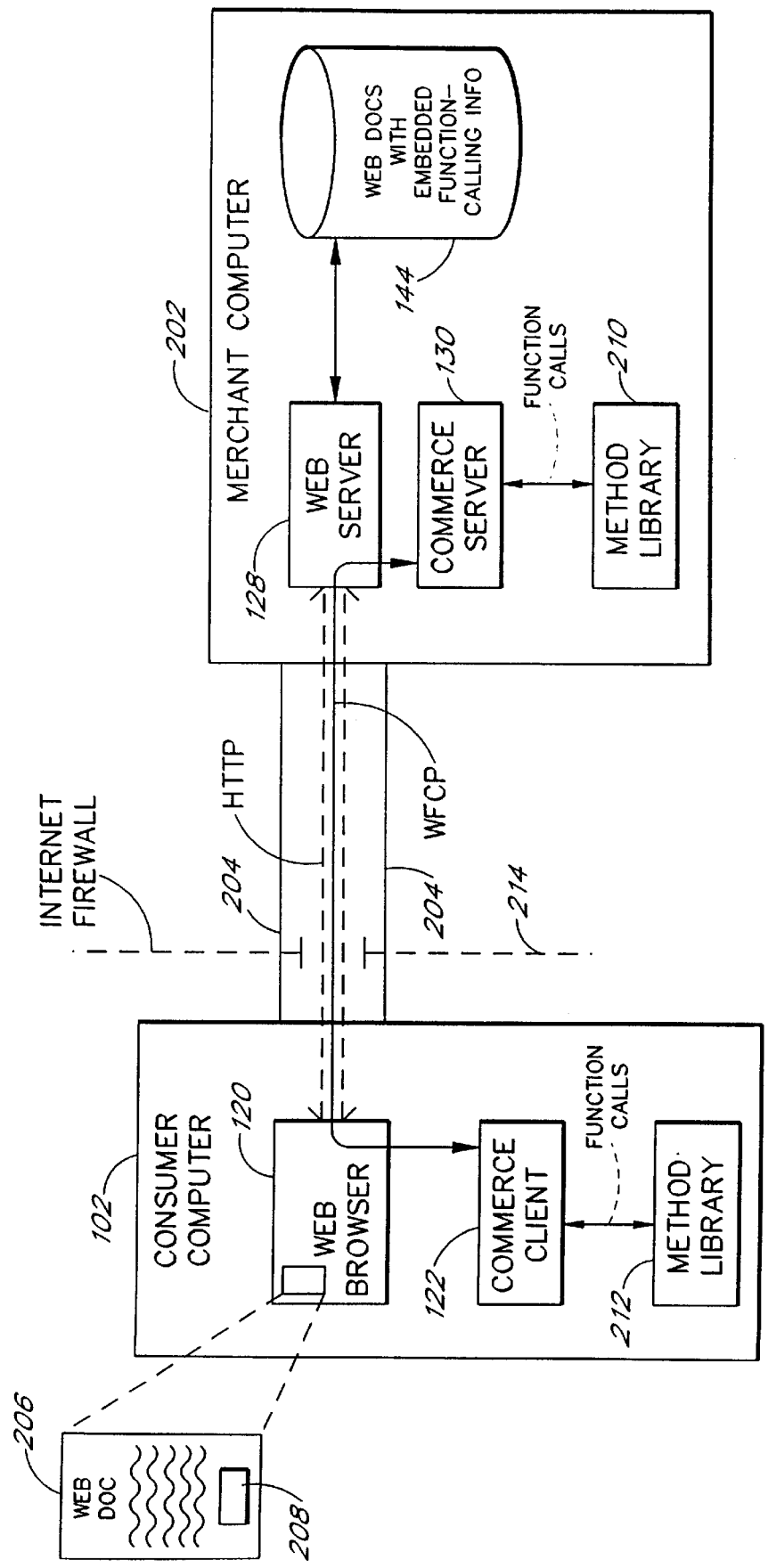
FIG. 2 illustrates a preferred protocol for transferring function call requests and responses between the consumer computer and a merchant Web site of the system using the HTTP message stream between a standard Web browser and a Web server.

FIG. 2 illustrates communication between a consumer computer 102 and a merchant computer 202. A consumer accesses a merchant computer 202 on the Internet 204 via a consumer computer 102. The consumer computer 102 includes a standard Web browser 120, and the merchant computer 202 includes a Web server 128. The Web browser 120 and the Web server 128 use the HTTP protocol to communicate with each other over the Internet.

The Web server 128 running on the merchant computer 202 accesses a local store 144 of HTML documents (also commonly referred to as "Web documents" or "Web pages"). When the Web browser 120 on the consumer computer 102 requests an HTML document, the Web server 128 retrieves the HTML document and transmits it to the Web browser 120 on the consumer computer 102 where it is viewed by the consumer. These documents typically include information about the merchant, as well as information about the products sold by the merchant (including pictures and descriptions of products and product prices).

To provide more sophisticated shopping transactions between consumers and merchants, software dedicated to providing consumer-oriented shopping functions (the commerce client 122) executes on a consumer's computer, and software dedicated to providing merchant-oriented functions (the commerce server 130) executes on a merchant computer 202. One objective of the present invention is to provide both a commerce client 122 running on the consumer computer 102 which communicates directly with the Web browser 120, and a commerce server 130 running on the merchant computer 202 which communicates directly with the Web server 128.

The commerce client 122 and the commerce server 130 utilize the Internet-based communication between the Web browser 120 and the Web server 128 to communicate with each other. An extensible Web function-calling protocol ("WFCP") permits the commerce client 122 and the commerce server 130 to pass functions calls to each other by embedding the function calls in data exchanged via the Internet by the Web browser 120 and the Web server 128. As illustrated in FIG. 2, the Web function-calling protocol effectively "tunnels" function-calling information (requests and responses) through an HTTP message stream (shown in dashed lines) between the standard Web browser 120 and the Web server 128. One significant benefit of the use of HTTP is that it allows the consumer computer 102 to communicate with merchant Web sites from behind Internet firewalls 214 which permit passage of HTTP traffic.

The Web server 128 serves HTML documents which include embedded function calling information. This function calling information is embedded in a hidden form using standard HTML tags, and is provided in a predefined format (specified as part of the WFCP) that is recognized by both the commerce client 122 and the commerce server 130. Generally, the embedded function calling information corresponds to consumer-selectable options (e.g., hyperlinks or buttons) within HTML documents to allow a consumer to initiate client-to-server function calls across the Internet by selecting (with mouse or keyboard) transaction options.

FIG. 2 illustrates an HTML document 206 being displayed by the Web browser 120. The HTML document 206 includes a consumer-selectable button 208 associated with a textual description (such as "buy," "update shopping basket," "retrieve price information," or "retrieve account information") of a corresponding action to be performed. When the consumer clicks on this button, corresponding function-calling information is passed across the Internet as a standard HTTP POST message from the consumer computer 102 to the merchant computer 202.

The function calling information for making a corresponding function call typically includes the name of an object, an object interface, a method, and an argument list. If the button 208 activates a "Calculate Tax" option, the corresponding function-calling information associated with the button may, for example, include the text:

OBJECT=MSTaxEngine.1

INTERFACE=ITaxCalculation

METHOD=CalculateTaxDue

ARGS=arglist

This function-calling information is provided in the HTML document along with a target URL (of the merchant Web site 104, 106) such that an HTTP POST message containing the information will be sent to the URL if the consumer clicks on the button 208. One example of an HTML-coded form of the HTTP POST message is:

```
<HTML>
    <!---WFCP FORMATTED CALL--->
    <FORM ACTION=http://www.merchant.com/mig.dll
            METHOD="POST"
            ENCTYPE="application/x-www-form-urlencoded">
        <INPUT type=hidden name=OBJECT value=MSTaxEngine.1>
        <INPUT type=hidden name=INTERFACE value=ITaxCalculation>
        <INPUT type=hidden name=METHOD value=CalculateTaxDue>
        <INPUT type=hidden name=ARGS value=arglist>
        <INPUT type=submit value="Calculate Sales Tax">
    </FORM>
</HTML>
```

Although the target URL in this example corresponds to the Web site that is the source of the HTML document, the target URL could be that of a different Web site.

Thus, when the consumer clicks on the button 208, the Web browser 120 generates an HTTP POST message coded using HTML and sends the HTTP POST message to the URL of the merchant Web site 104, 106. This message includes function-calling information (object, interface, method and arguments) to invoke a method (i.e., a software callable procedure or function) of a method library 212 on the merchant computer. If multiple function calls were linked to the button 208, the HTTP POST message would include the function-calling information for each such function call.

Upon receipt of the HTTP POST message, the Web server 128 parses the message, invokes the commerce server 130 (if not already executing) and passes the function-calling information to the commerce server 130. The commerce server 130 then invokes the specified object, and passes the arguments to the specified method using the specified interface; the commerce server 130 thereby makes the function call on behalf of the commerce client 122. Depending upon the method called, the function call may, for example, involve a query of and/or an update to a merchant database.

This function call will typically produce a response which must be communicated to the consumer computer 102. (In the context of electronic shopping, the response message may include, for example, price or inventory information for a particular product, or the result of a tax calculation requested by the consumer.) The response may include a function call or other information directed specifically to the commerce client 122. The Web browser 120 receives all data transmitted from the merchant computer 202 to the consumer computer 102. However, some of the data received by the Web browser 120 is further routed to the commerce client 122.

The Web server 128 transmits data to the consumer computer 102 by first packaging the data as a MIME message and then sending the MIME message across the Internet from the Web server 128 to the Web browser 120. If the response message is in the form of an HTML response to be displayed by the Web browser 120, the MIME type of the message will be HTML. If, on the other hand, the response message is directed to the commerce client 122 (such as when the response includes non-HTML product information), the response message will be tagged with a MIME type which corresponds to the commerce client 122, causing the Web browser 120 to forward the message to the commerce client 122.

In the preferred embodiment, the MIME type associated with the commerce client is "x-ishopper." The message generated on the server side may include information to call a function on the consumer computer 102, in which case the MIME message will include function-calling information. This server-to-client function-calling information specifies the object, method, interface, and arguments of the client-side function call and is specified within the MIME message using the same format (illustrated above) as used for client-to-server function calls.

Upon receiving a MIME message of type "x-ishopper," the Web browser 120 strips off the MIME headers and passes the message to the commerce client 122. As described further below, the commerce client 122 acts as a MIME handler for messages of type "x-ishopper." The commerce client 122 then invokes the method indicated in the MIME message on the consumer computer 102 in the same manner performed by the commerce server 130 on the merchant computer 202.

Thus, using HTTP POST messages and MIME messages, function calls are placed on the merchant computer 202 by the consumer computer 102 and function calls are placed on the consumer computer 102 by the merchant computer 202. Advantageously, WFCP is not tied to any specific function or set of functions. Thus, new client-side and server-side functions can be added (and embedded within HTML documents) without modification to the existing function-calling components. The WFCP protocol is described in further detail in a copending U.S. patent application Ser. No.

08/670,882, entitled SYSTEM AND METHOD FOR MAKING FUNCTION CALLS OVER A DISTRIBUTED NETWORK, filed Jun. 28, 1996, which is hereby incorporated by reference, in its entirety.

A further advantage, however, is gained in providing the Web browser 120 with a method to invoke local functions on the consumer computer 102. Using the same HTTP POST message format, the Web browser 120 invokes local functions by specifying a URL address that resolves to a local port. Rather than addressing an HTTP POST message to a remote site on the Web by using a URL similar to "http://www.sporting_goods.com", the Web browser 120 directs the HTTP POST to the local consumer computer 102 by using the URL "127.0.0.1:100" (note that ":100" specifies local port 100). This method of directing an HTTP POST message to the local computer is facilitated by the local host service of the TCP/IP protocol stack. The URL "127.0.0.1" is a local loop-back address recognized by the local host service as identifying the local machine as the recipient of the message.

A port listener process operates on the local machine 102 monitoring a designated port such as, for example, port 100. The port listener receives the HTTP POST message, parses the content, and passes function-calling data directly to the commerce client 122. Thus, local functions are invoked by selected options coded in and hosted by a Web document wherein function-calling information is associated with the selected options. This method for making local function calls from a Web browser is described in further detail in a copending U.S. patent application Ser. No. 08/671,580, entitled SYSTEM AND METHOD FOR MAKING FUNCTION CALLS FROM A WEB BROWSER TO A LOCAL APPLICATION, now U.S. Pat. No. 5,956,483 issued Sep. 21, 1999, which is hereby incorporated by reference in its entirety.

It will be appreciated by those skilled in the art that specialized client and server processes provide substantial benefits in the context of computer-based shopping. For example, a merchant can conveniently store relatively static catalog information as HTML documents, while storing relatively dynamic product information (such as price and inventory) in a separate database (not shown in FIG. 2) which is accessed by the commerce server 130. This product information may advantageously be stored and served in a format which is recognized only by the specialized commerce client 122 (as opposed to the standard Web browser 120). Because the commerce client 122 runs in conjunction with the Web browser 120, the commerce client 122 can readily store both consumer-selected HTML (catalog) data from Web pages of merchants, and the associated non-HTML product information retrieved via client-to-server function calls.

As noted above, because all information is passed via HTTP, the commerce client 122 and commerce server 130 can advantageously communicate through Internet firewalls 214 which are typically configured to permit the passage of TCP/IP messages addressed to port 80 and which, for security reasons, are configured to block communications addressed to other ports.

Although FIG. 2 depicts a single Web server 128 interacting with a single commerce server 130, it will be recognized that other system configurations are possible. For example, multiple Web servers 128 could be provided (running on the same machine or on different machines) which interact with a single, shared commerce server 130; or, multiple commerce servers 130 could be provided which interact with a single Web server 128.

D. Software Architecture of Merchant Web Site

Figure 3:
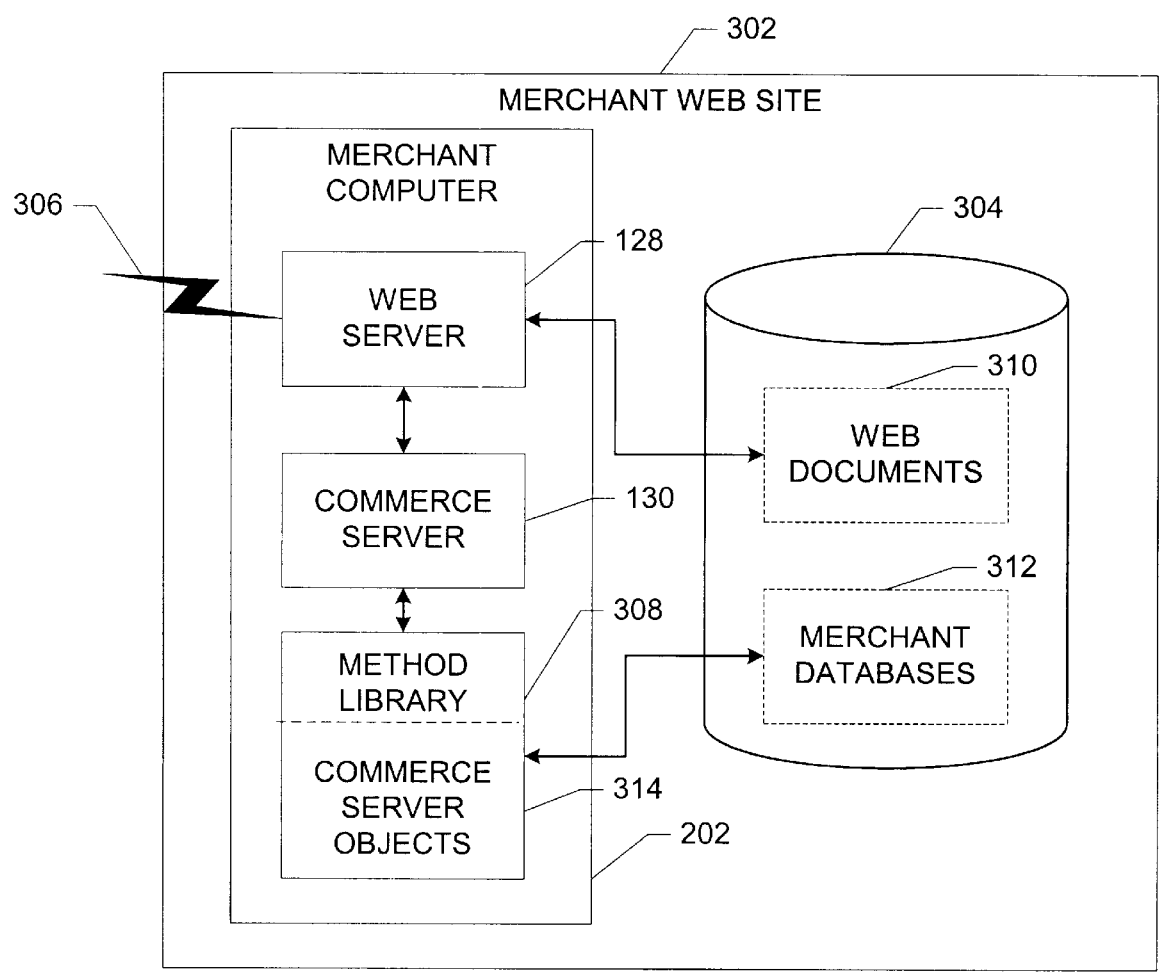
FIG. 3 illustrates a preferred software architecture for the merchant Web sites of the system.

FIG. 3 illustrates a preferred architecture of a merchant Web site 302 of the computer-based shopping system. As shown in FIG. 3, the merchant Web site 302 includes a merchant computer 202, a storage device 304 (corresponding in function to the storage device 144 of FIG. 2), and an Internet connection 306. Software operating on the merchant computer 202 includes a Web server 128, the commerce server 130, and a method library 308 (corresponding to the method library 210 of FIG. 2). A collection of Web documents 310 is stored on the storage device 304 as are various merchant databases 312.

The merchant Web site 302 may, for example, be a stand-alone site which independently serves information with respect to a single merchant, or may be in the form of (or a part of) a centralized or distributed electronic mall system which serves the information of many different merchants. The Web server 128 is preferably the Microsoft Internet Information Server version 1.0, although other conventional Web servers can be used. The commerce server 130 is preferably in the form of an ISAPI (Internet Server Application Program Interface) DLL (dynamic link library) which runs within the same process space as the Web server 128. The commerce server 130 has access to commerce server objects 314 located within the same process space as the commerce server 130 and the Web server 128. A CGI script, or a DLL which uses another server extension API (such as NSAPI from Netscape), could alternatively be used.

The Web documents 310 stored on the merchant Web site 302 are preferably coded using HTML. The Web documents 310 contain HTML coding which, when received by a Web Browser 120, display various icons or buttons on the screen 114 of the consumer computer 102 along with text or pictures comprising the content of the Web document. As described above, these icons or buttons comprise selectable options which correspond to shopping-related transactions. In the preferred embodiment, the Web documents 310 offer consumers options to add product information to an electronic shopping basket, view products collected but not yet purchased, view products already purchased, enter payment information into an electronic wallet, place shipping addresses in an electronic address book, as well as order goods from Web-based merchants. These selectable options coded into the Web documents 310 have function-calling information associated with them (as described above) to invoke executable functions on the consumer computer 102 or back on the Web server 128 when selected. Web documents with embedded client-side function calls are also preferably stored on the hard disk of the consumer computer 102 as part of the user interface of the commerce client 130, allowing the user to invoke client-side functions (such as viewing the shopping basket) while off-line.

The method library 308 of the merchant Web site includes methods for performing client services such as retrieval of product information, calculation of sales taxes, and capture of orders. Some of these methods are listed and described in Table 1.

TABLE 1

| Method | Description |
| --- | --- |
| GetLineItem | Retrieves product information given SKU (stock keeping unit) number or other product identifier. |
| GetPrice | Retrieves price information given SKU number or other product identifier. |

TABLE 1-continued

| Method | Description |
| --- | --- |
| CalculateSH | Calculates shipping and handling costs given product/s and shipping logistics (e.g., shipping address and method). |
| CalculateTaxDue | Calculates shipping and handling costs given product/s and shipping logistics |
| ProcessOrder | Captures order submitted by consumer, and processes in a manner specified by merchant. |

The commerce server 130 performs two primary tasks. First, when a request is received for product information (via function-calling information embedded within an HTTP POST message received by the Web server 128), the commerce server retrieves various data items in connection with a product, such as SKU (stock keeping unit) number, product name, product description, logo, price, expiration date, tax, and shipping charges. This data is packaged as a MIME file of type "x-ishopper" and sent back to the consumer computer 102 via the Web browser 120, as described above. Second, the commerce server 130 captures and processes orders for products submitted by consumers.

In accordance with the present invention, the merchant sites of the system prepare and serve HTML Web documents 310 which present uniform transaction options, such as View Shopping Basket, Show Wallet, and Initiate Payment.

Due to the wide variety of inventory management systems and legacy (long-existing and difficult to change) product information databases, as well as accounts receivable systems, the commerce server will often comprise custom interface software that will change from merchant to merchant. The present invention is primarily concerned with the consumer platform.

E. Software Architecture of Consumer Computer

Figure 4:
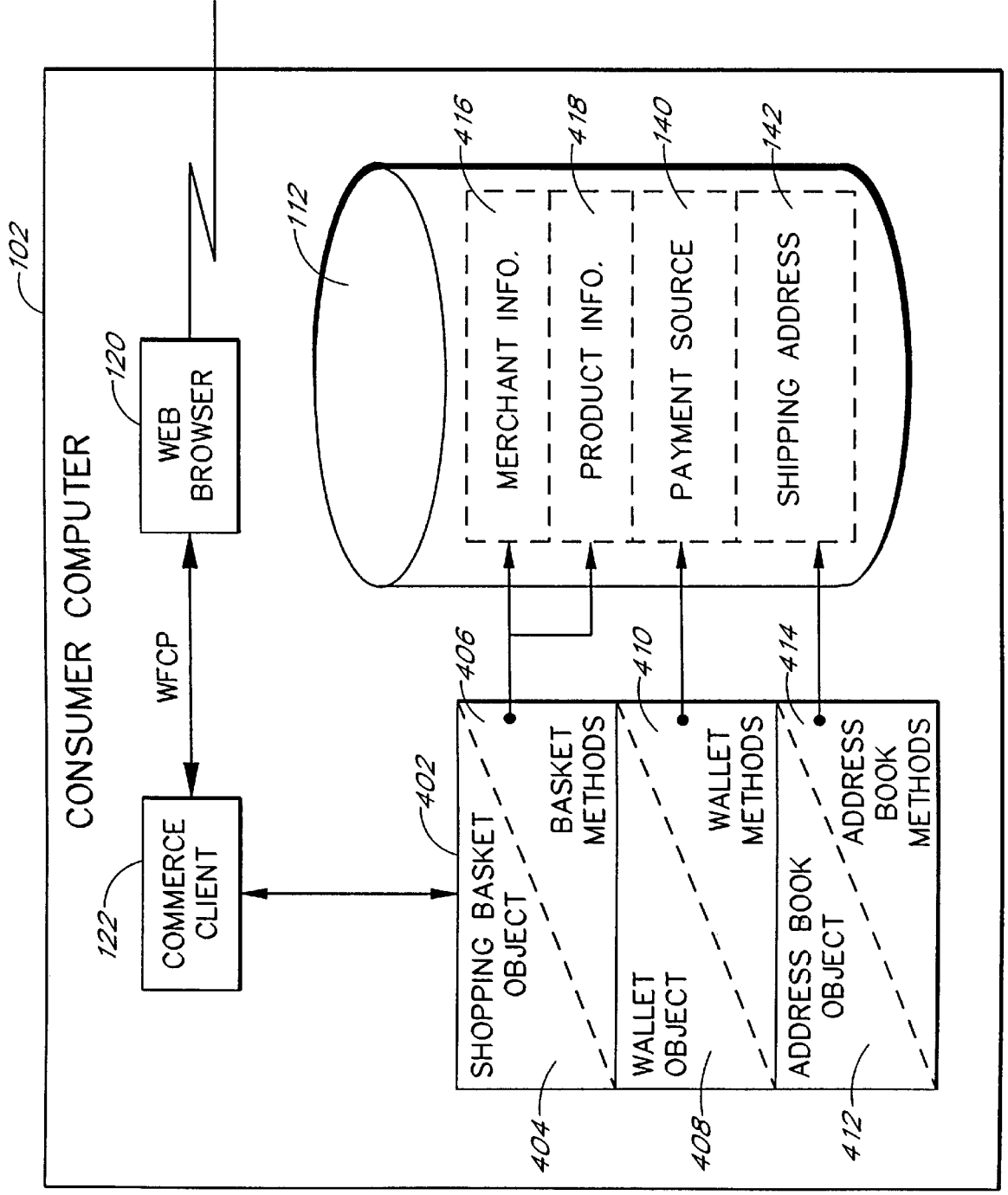
FIG. 4 illustrates a preferred software architecture for the consumer computers of the system.

FIG. 4 illustrates the software architecture of the consumer computer 102. The architecture comprises a conventional Web browser 120 (such as Microsoft's Internet Explorer 2.0, or Netscape Navigator 2.0), the commerce client 122, and a commerce client object library 402, and a storage area 112. The commerce client object library 402 comprises a shopping basket object 404 having associated shopping basket methods 406, a wallet object 408 having associated wallet methods 410, and an address book object 412 having associated address book methods 414. The storage area 112 comprises merchant information 416, product information 418, payment source data 140, and shipping address data 142, all of which has been selectively stored and/or manually entered by the user.

The Web browser 120 is preferably configured such that the commerce client 122 is a MIME-handler application. Generally, a MIME-handler is a software application designed to provide specialized processing of specific types of files received over the Internet by a Web browser 120. The Web browser 120 of the present invention is configured to associate the MIME type "x-ishopper" with a certain file name extension such as "ish." When the Web browser 120 receives a file of type "x-ishopper," the Web browser will cause the commerce client 122 application to begin executing (if not already running). The Web browser 120 will then pass the received "x-ishopper" file to the commerce client 122 for further processing. Extending the functionality of a Web browser by configuring the Web browser to associate specific file types with file name extensions and then associating specialized MIME-handler applications with file name extensions is well known and will not be further discussed herein.

The commerce client 122 executes on the consumer computer 102 as a separate process from the Web browser 120 and is a standard executable program. The commerce client 122 begins executing when launched by the Web browser 120 upon the Web browser's receipt of a file of MIME type "x-ishopper." Another way in which the commerce client 122 begins executing is when a local port listener task receives a message from the Web browser 120 which was directed at a local port. The port listener launches the commerce client 122 if it is not already executing.

Still another way of launching the commerce client 122 is by running the commerce client program directly. As explained below in more detail, many functions ("local" functions) of the commerce client 122 do not require an Internet connection or transmission of data to or from a Web site. These local functions are available via user-interface HTML documents which reside on the consumer computer's hard disk. The commerce client 122 executes until the consumer selects an option causing the commerce client 122 to stop executing.

When the commerce client 122 starts running, it performs an initial task of loading structures in memory from data stored on the hard disk or other fixed storage media. The data represent merchant information, product information, payment source information, and shipping addresses. The data are stored in such a way as to be easily read into memory while maintaining relationships (links) among the data. Such construction of interlinked in-memory structures from data stored on a hard disk is well known in the art. When the commerce client 122 shuts down or otherwise terminates normally, it writes the interlinked in-memory structures to hard disk storage in a manner that preserves all the relationships among the data.

The data comprising the in-memory data structures are accessed and manipulated through objects. The shopping basket object 404 is associated with shopping basket methods 406 which read, write, modify, and display information about merchants and/or products of interest to the consumer. The shopping basket methods 406 interact primarily with in-memory structures comprising product and merchant information. In accordance with the present invention, data for each product are preferably organized into groups as shown in Table 2.

TABLE 2

| Product Data Field | Description |
| --- | --- |
| Logo | Picture associated with product. Type: VOID* |
| LogoSize | Size of Picture associated with product. Type: DWORD |
| Name | Name of product. Type: Cstring |
| Description | Description of product. Type: Cstring |
| Price | Unit Price of product. Type: Currency |
| Quantity | Quantity of product to order. Type: Float |
| ExpirationDate | Date on which offered price expires. Type: Cstring |
| Tax | Amount of tax computed for sale of product. Type: Currency |
| ShippingCharge | Cost to ship product as ordered. Type: Currency |

TABLE 2-continued

| Product Data Field | Description |
| --- | --- |
| OtherCharges | Miscellaneous additional charges associated with order.<br>Type: Currency |
| SKU | Stock Keeping Unit, merchant's identifier for product<br>Type: Cstring |
| ShipMethod | Delivery services to be used in shipping product.<br>Type: Cstring |
| OrderURL | URL string identifying Web site to send order for product<br>Type: Cstring |
| ReferenceURL | URL string identifying Web site for information about the product<br>Type: Cstring |
| PaymentFriendlyName | Reference to entry in Payment Database identifying source of payment if product is ordered (e.g., Visa, Checking Acct., etc.)<br>Type: CString |
| AddressFriendlyName | Entry in Shipping Address DB identifying where to ship product<br>Type: CString |
| Flags | 0 if product has not been purchased; 1 if product has been purchased<br>Type: DWORD |

There may be a variety of properties associated with a product which are unique to that product and are not associated with other products. Such properties are represented in name/value pairs in memory and can be referenced from an in-memory product structure through an associated pointer to a linked list of such properties. The property data are organized as shown in Table 3.

TABLE 3

| Property Data Field | Description |
| --- | --- |
| Name | Name of property<br>Type: Cstring |
| Value | Value of property<br>Type: Variant |
| Flags | Stores various flag values<br>Type: DWORD |

Merchant data preferably comprise associated fields as shown in Table 4.

TABLE 4

| Merchant Data Field | Description |
| --- | --- |
| Logo | Logo associated with merchant.<br>Type: VOID* |
| Logosize | Size of logo associated with merchant.<br>Type: DWORD |
| Name | Name of merchant.<br>Type: Cstring |
| LineItemList | Pointer to linked list of product data structures<br>Type: Pointer |

The wallet object 408 is associated with wallet methods 410 which provide access to payment source data (such as credit card numbers and checking account numbers) used for making on-line purchases. Payment source data are stored in memory preferably according to associated fields as shown in Table 5.

TABLE 5

| Payment Data Field | Description |
| --- | --- |
| FriendlyName | Easily remembered and recognized name for payment source<br>Type: Cstring |
| CardNumber | Credit card or account number<br>Type: Cstring |
| ExpirationDate | Date on which credit card expires.<br>Type: Cstring |
| CustomerName | Name of card holder or account holder<br>Type: Cstring |
| IssuingBank | Name of bank issuing credit card or account<br>Type: Cstring |
| BillToAddress-FriendlyName | Reference to address database indicating address to be billed when payment source is used to order product.<br>Type: Cstring |

The address book object 412 is associated with address book methods 414 which access address information for shipping purposes. The address book methods 414 access address data preferably organized as shown in Table 6.

TABLE 6

| Address Data Field | Description |
| --- | --- |
| FriendlyName | Easily remembered and recognized name for addresses<br>Type: Cstring |
| Name | Name of person to receive parcels at address<br>Type: Cstring |
| Address1 | First text line of shipping address.<br>Type: Cstring |
| Address2 | Second text line of shipping address<br>Type: Cstring |
| Address3 | Third text line of shipping address<br>Type: Cstring |
| City | Name of city of shipping address<br>Type: Cstring |
| State | Name of state of shipping address<br>Type: Cstring |
| Zip | Zip code of shipping address<br>Type: Cstring |
| Country | Name of country of shipping address<br>Type: Cstring |
| Phone1 | First phone number associated with shipping address<br>Type: Cstring |
| Phone2 | Second phone number associated with shipping address<br>Type: Cstring |

The shopping basket object 404, wallet object 408, and address book object 412 are preferably implemented as in-process COM (component object model) compliant objects, implemented as a single DLL (dynamic link library). The component object model is well-understood in the art and will not be further discussed. One skilled in the art will, however, appreciate that callable functions with appropriate associated data structures could be used in place of the shopping basket object 404, the wallet object 408, and the address book object 412 and their respective associated methods 406, 410, 414.

Figure 5:
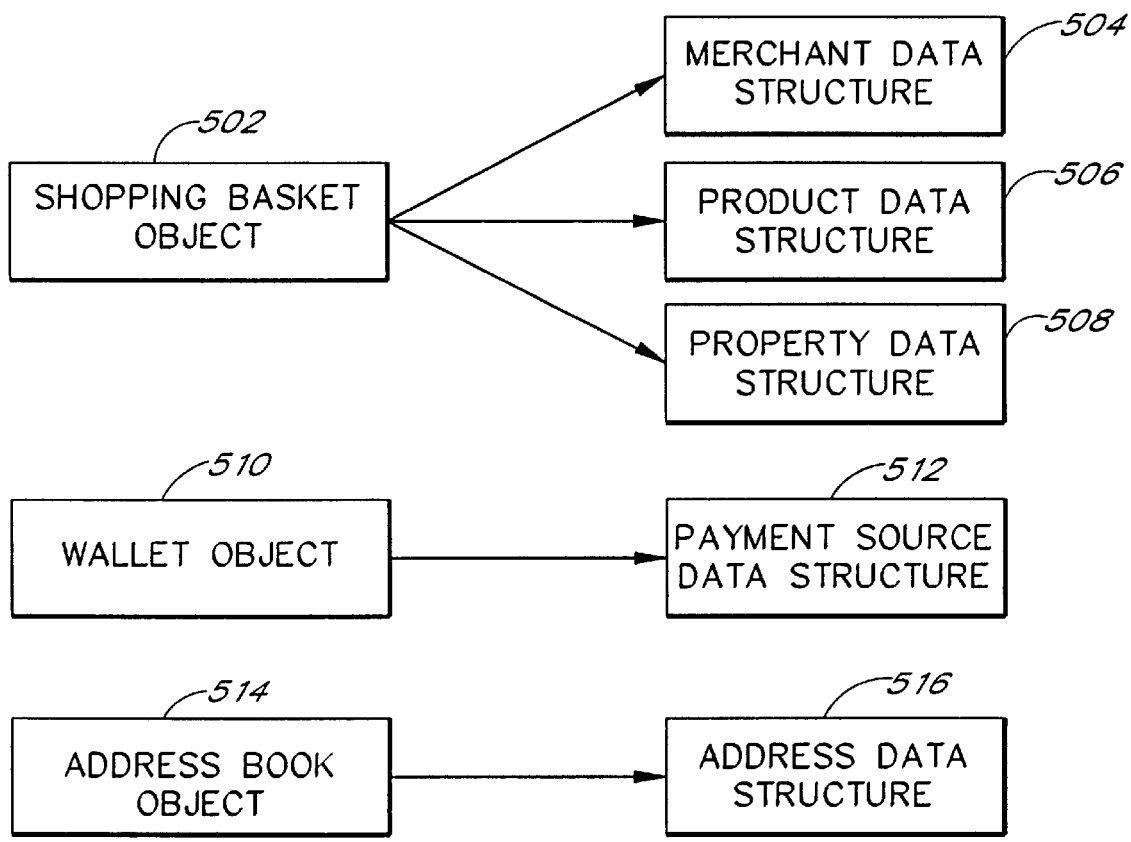
FIG. 5 illustrates data structures accessed and manipulated by shopping basket, wallet, and address book objects on the consumer computer.

FIG. 5 illustrates generally the type of data accessed by the primary objects of the commerce client. A shopping basket object 502 accesses and manipulates merchant data structures 504, product data structures 506, and product property data structures 508. A wallet object 510 accesses and manipulates payment source data structures 512. An address book object 514 accesses and manipulates address book data structures 516.

As described above, the commerce client 120 responds to various function-calling information embedded in MIME files of type "x-ishopper" passed from the Web Server 128 through the Web browser 120, and also responds to function-calling information received indirectly from the Web browser 120 by way of a local port to which the Web browser directs data meant for the commerce client 122. The function-calling information identifies objects and methods which the commerce client 122 invokes.

When viewing a Web document 310 which, for example, describes a product (hosts an item) and which is coded according to the present invention, the standard Web browser displays an ADD ITEM-type option to the consumer which allows information about a product to be stored in the electronic shopping basket (in computer memory, and eventually written to a hard disk). The ADD ITEM option can be selected, for example, when the consumer has interest in the product, even if the consumer has not yet decided to purchase the product. The Web document 310 will also typically include a product form which is displayed on the consumer's computer screen. The product form represents a number of attributes which can be set by the consumer by filling in values. After setting attributes as desired (e.g., selecting a size or color for the product), the consumer selects the ADD ITEM option to store such "user preference" attributes along with the information provided by the merchant.

Figure 6:
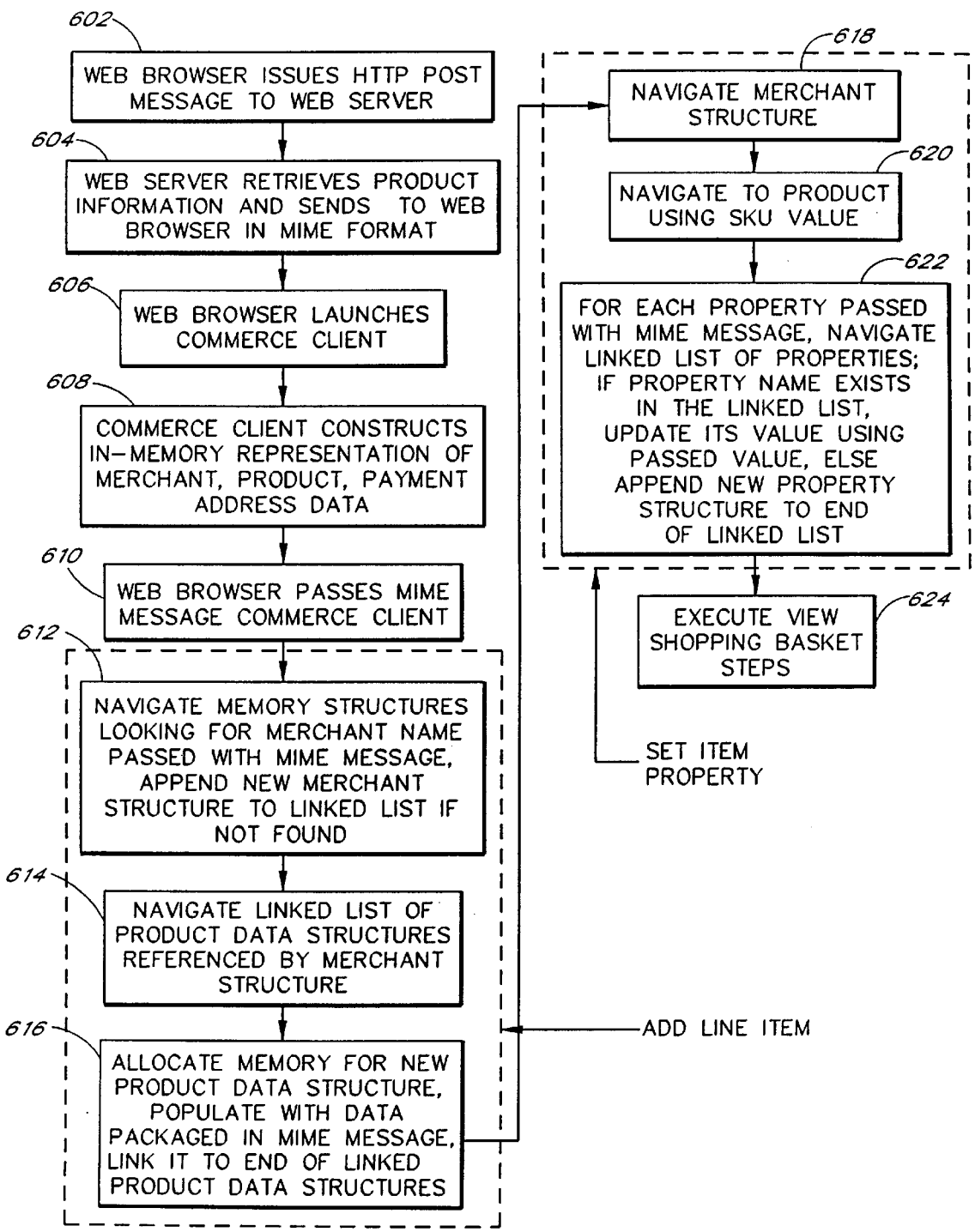
FIG. 6 illustrates the steps performed in adding information (served by a merchant Web site) about a product to the shopping basket object.

FIG. 6 illustrates the steps performed when a consumer selects the ADD ITEM option. In a first step 602 the Web browser 120 issues an HTTP POST message to the Web server 128 indicating that a consumer has selected an ADD ITEM option. In a next step 604, the Web server 128 retrieves product information from the merchant web site and sends the information to the Web browser 120 as a MIME message of type "x-ishopper." Next, in a step 606, the Web browser 120, after establishing receipt of a MIME message of type x-ishopper, launches the commerce client 122 (if it is not already running). The commerce client, in a step 608, constructs an in-memory representation of merchant, product, payment, and address data read from a hard disk. Then, in a step 610, the Web browser 120 passes the MIME message to the commerce client 122.

The commerce client 122 uses function-calling information embedded in the passed MIME message to call a method AddLineItem. In the step 612, the AddLineItem method navigates memory structures (constructed in step 608) looking for a merchant data structure with a name field matching the merchant name passed with the MIME message. If no such merchant structure is found in the step 612, then a new merchant structure is appended to the linked list of merchants by allocating memory and the new merchant structure is populated with merchant data from the passed MIME message. The AddLineItem method then, in a next step 614, navigates a linked list of product data structures associated with the merchant structure (either found or created in the step 612). Each product data structure in the list represents one product offered for sale by a merchant. In the step 616, the AddLineItem method allocates memory for a new product data structure and populates it with data packaged in the MIME message such as product SKU, price, quantity, description, name, logo, color, or size. The AddLineItem method then links the new product data structure to the end of the linked product data structures for the merchant.

In a step 618, the commerce client 122 invokes a SetItemProperty method wherein the linked list of merchant structures is again navigated until a merchant structure having a merchant name matching the passed merchant name is found. In a step 620, the product data structures referenced by the merchant structure are navigated until a product data structure is found having an SKU field equivalent to the SKU number passed in the MIME message. Then, in the step 622, the SetItemProperty method navigates a linked list of properties referenced by the product data structure found, and does so for each property passed in the MIME message. When a property structure is found whose name matches the passed property name, the value associated with the matched property name is replaced with a value passed in connection with the property name. In each case where the property list is navigated and no matching property name is found, the SetItemProperty method appends a new property data structure to the linked list of properties. The SetItemProperty method allocates memory for the new property data structure and fills in the name and value and flag fields as appropriate from the data in the passed MIME message.

In a step 624, the commerce client 122 then executes the steps comprising the VIEW SHOPPING BASKET option described below. Thus, when the steps comprising the ADD ITEM option are completed, a new product data structure is stored in memory comprising data fields such as SKU, price, quantity, picture, description, reference URL, and merchant information. Also, any special properties associated with the product such as size, color, or finish, are also stored with the new product data structure. As explained below, default payment source information and default shipping address information are also associated with a new product data structure.

Web documents 310 served by Merchant Web sites and/or stored locally on the consumer computer 102 offer consumers a selectable option called VIEW SHOPPING BASKET. This option allows consumers to retrieve a list of all the products that have been placed inside the electronic shopping basket using the ADD ITEM option.

Figure 7:
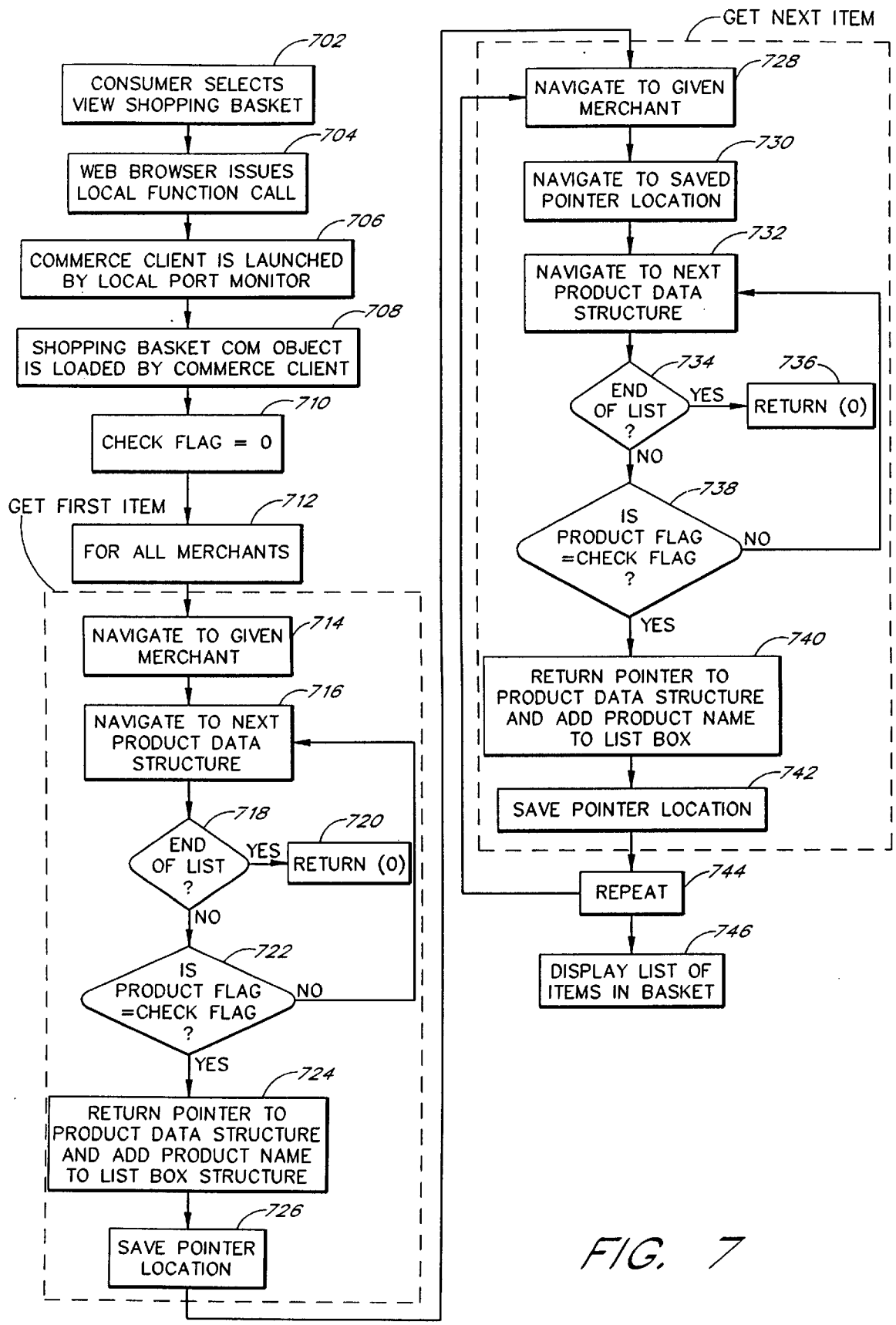
FIG. 7 illustrates the steps performed in viewing product information stored within the shopping basket.

FIG. 7 illustrates the steps in carrying out the VIEW SHOPPING BASKET option. In a first step 702, the consumer selects the VIEW SHOPPING BASKET option from within the Web browser. In a next step 704, the Web browser 120 issues a local function call. Then, in a step 706, the commerce client 122 is launched (if not already executing) by a local port monitor detecting the local function call. Next, in a step 708, the commerce client 122 loads the shopping basket COM object. In a next step 710, a variable CheckFlag is set equal to 0. Then, in a step 712, a loop is entered and is executed once for each merchant data structure.

In a step 714, the commerce client 122 invokes a GetFirstItem method. In the step 714, the GetFirstItem method navigates to a given merchant. In this first iteration of the loop, the given merchant will simply be the first merchant in the merchant data structure list. In the step 716, the linked list of product data structures referenced from the first merchant data structure is navigated to the first product data structure. If, in the step 718, it is determined that there are no product data structures for this merchant or the navigation of the product data structure list has reached the end of the list, then, in a step 720, the GetFirstItem method returns a value of 0. If in the step 718 it is determined that another product data structure exists and that the end of the product data structure list has not yet been reached, then the flag field of the product data structure is compared against the CheckFlag variable. Because CheckFlag is equal to 0, the product flag is being compared against the value 0 which would indicate that the product has not yet been purchased. If in the step 722, it is determined that the product flag is not equal to the CheckFlag then processing reverts back to the step 716 to check the next product data structure in the list. If, however, in the step 722, the product flag is equal to the CheckFlag, indicating that the product has not yet been purchased, then in a step 724, a pointer is returned pointing to the product data structure of the product that has not been purchased and the name of the product that has not been purchased is added to a list box structure. Next, in a step 726 the pointer to the product data structure is saved and iterations of the loop are terminated.

In the step 728, the GetNextItem method is invoked which begins by navigating to a given merchant. In the step 730, a current chain of linked product data structures is navigated to a point equal to a saved pointer location (the pointer location saved in step 726 if this invocation of GetNextItem immediately follows the termination of the GetFirstItem method, otherwise the pointer location saved in the step 742 is used). Next, in the step 732, the next product data structure in the linked list is examined. If in the step 734 it is determined that the end of the product data structure list has been reached then in the step 736, a 0 is returned. If, however, in the step 734 it is determined that the end of the product data structure list has not yet been reached then, in the step 738, the product flag is compared against the CheckFlag. If in the step 738 the product flag is not equal to the CheckFlag then processing resumes in the step 732 examining the next product data structure in the list. If however, in the step 738 the product flat is equal to the CheckFlag then, in the step 740, a pointer is returned to the product data structure and the name of the product is added to the list box structure. Next, in the step 742, a pointer to the product data structure is saved. The GetNextItem method is then invoked again beginning at step 728 where the list of merchant data structures is navigated to the current merchant and the steps 728 through 742 are repeated until the end of the merchant data structure is reached.

When, in a step 744, the end of the merchant data structure list is reached, then in a step 746 a scrollable list of product names appears on the consumer's computer screen. The list of product names corresponds to all products currently in the electronic shopping basket which have not yet been purchased.

Web documents 310 also offer consumers a VIEW HISTORY option. By selecting VIEW HISTORY, a list of product names is displayed on the user computer, all of which have been purchased. In one embodiment, the steps illustrated in FIG. 7 in relation to the VIEW SHOPPING BASKET option are all performed in relation to the VIEW HISTORY option with one exception. In performing the VIEW HISTORY option, the CheckFlag variable in the step 710 is set equal to 1 instead of 0. Thus modified, the steps detect all product data structures whose flags are set to 1 indicating that they have already been purchased. The steps of FIG. 7 then construct a list of product names reflecting all of the products that have been purchased.

In another embodiment, selecting the VIEW HISTORY option causes a list of all product orders to be displayed. Each merchant structure has a reference pointer to a list of order structures. Each order structure, in addition to having fields for payment, shipping, and order tracking information, also has a reference pointer to a list of product structures. Thus, the linked list of merchants is traversed. For each merchant, the respective merchant's list of order structures is traversed. One display item is generated from each order structure. Each display item shows on the screen of the user computer, the purchase date, the payment information, the shipping address, the order tracking identifier, and the products ordered. Note, the products ordered are determined by traversing the linked list of product structures associated with each order structure. The VIEW HISTORY option advantageously allows consumers to examine past purchases whether such purchases occurred very recently or many years ago.

The VIEW SHOPPING BASKET and VIEW HISTORY options do not require a connection to the Internet to operate. In addition, these functions can optionally be invoked without using the Web browser. To perform these functions without a Web browser 120, the consumer initiates execution of the commerce client 122 by, for example, using a mouse and double-clicking an icon present on a graphical user interface of the consumer computer 102 (an icon with which the commerce client 122 executable program is associated). A commerce client user interface offers consumers a selection of options which do not require a connection to the Internet. These options are noted below to distinguish them from options which require Web-based communication.

Figure 8:
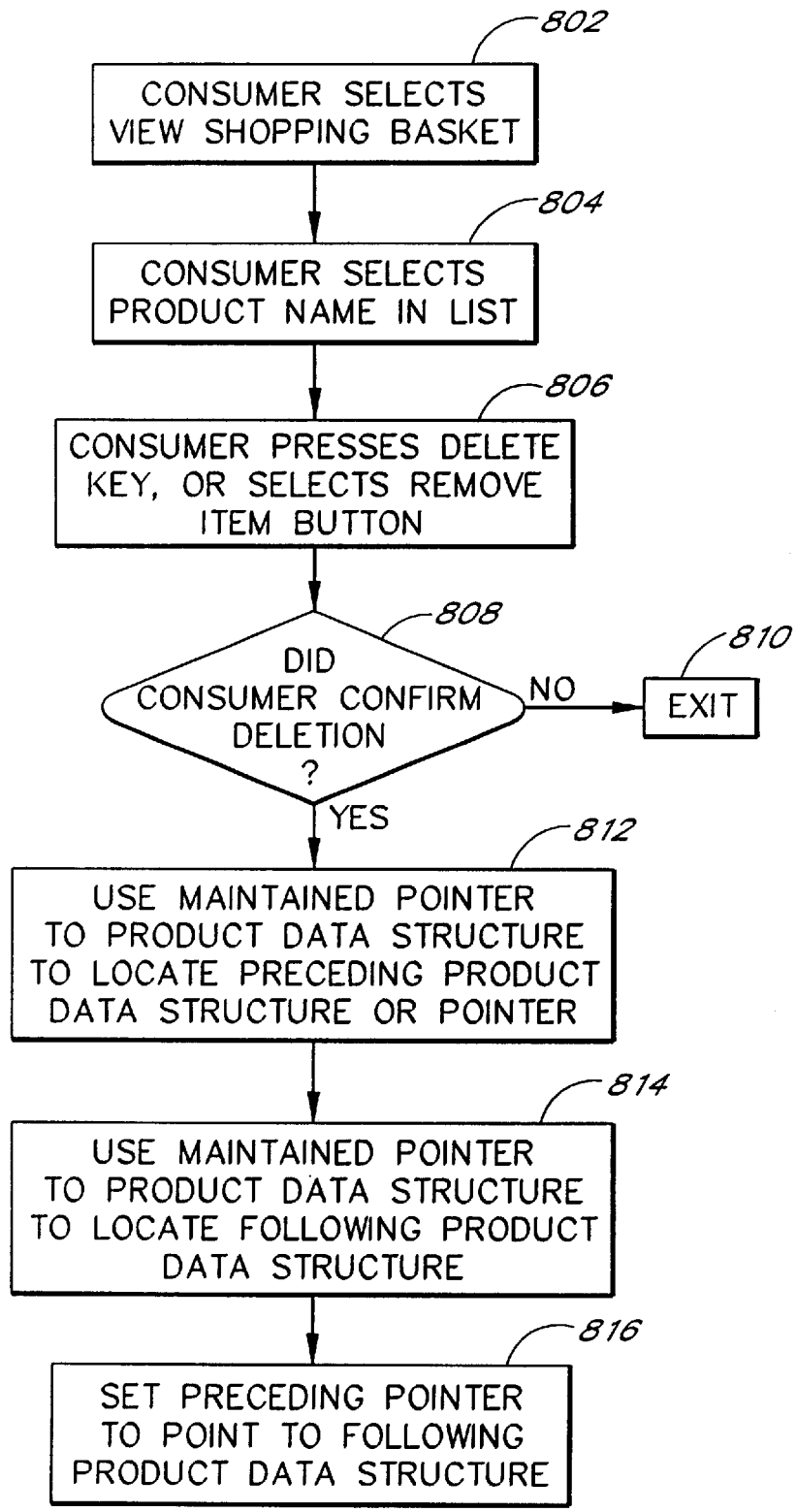
FIG. 8 illustrates the steps performed in deleting a product from the shopping basket.

Web documents 310 of the system may also host a DELETE ITEM option to remove an item from the electronic shopping basket. FIG. 8 illustrates the steps performed to carry out the DELETE ITEM option. In a first step 802, the consumer selects the VIEW SHOPPING BASKET option and is presented with a list of products which have been gathered but which have not been purchased. The DELETE ITEM option is then presented.

In a next step, 804, the consumer selects a product name from the list. Then, in a step 806, the consumer either selects the DELETE ITEM button or presses the delete key of the keyboard. The consumer is then prompted to confirm the deletion in a step 808. If the consumer does not confirm the deletion in the step 808, then, in a step 810, the steps of FIG. 8 terminate. If, however, in the step 808, the consumer does confirm the deletion, then the DeleteLineItem method is invoked.

A next step 812 then uses a pointer to the product data structure of the selected product to locate the preceding product data structure in a linked list. Locating a preceding structure in linked list is preferably done by implementing the list as a double linked list (one whose structures point both to the next structure as well as the preceding structure). It is possible that there is no preceding product data structure, that is, that the product data structure for the selected product is the first in the list of such product data structures that is referenced by a merchant data structure. In any case, a pointer to the product data structure will be located, it will simply belong to a merchant data structure rather than to a preceding product data structure.

In a step 814, the same pointer to the product data structure of the selected product is used to locate a following product data structure (i.e., one which follows the product data structure corresponding to the selected product). It is possible that there is no following product data structure or, in other words, the product data structure of the selected product has a NULL pointer to the next product data structure.

Finally, in a step 816, the pointer located in the step 812 (i.e., the pointer which points to the product data structure of the selected product) is set to point to the product data structure which follows the product data structure of the selected product. In the case where there is no product data structure following the product data structure of the selected product, then the pointer located in the step 812 is simply set to NULL. Thus, the product data structure of the selected product is no longer referenced (is delinked) from the in-memory data structures and is effectively deleted. The DELETE ITEM option is offered to consumers via the commerce client user interface as well as on Web documents displayed by the Web browser 120.

Another option that is presented to a consumer following selection of the VIEW SHOPPING BASKET option, is an option to SEE ITEM DETAILS. The SEE ITEM DETAILS option allows a consumer to check the value of the unique properties of a product (e.g., a selected color or size) as well as the payment source to be used in connection with a purchase and also the address the product is to be shipped to if ordered.

Figure 9:
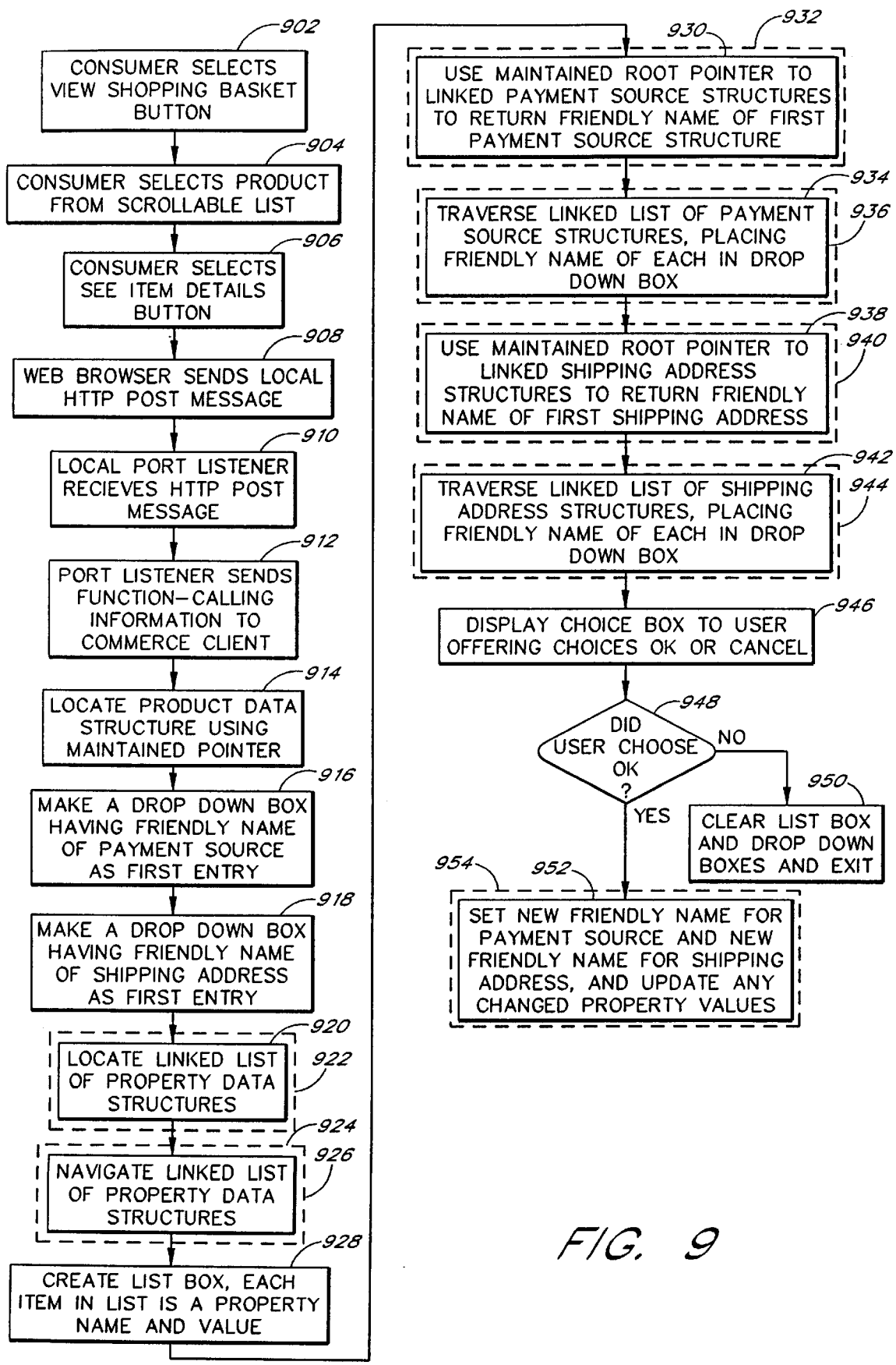
FIG. 9 illustrates steps performed in viewing details about a product from the electronic shopping basket.

FIG. 9 illustrates the steps performed in relation to the SEE ITEM DETAILS option. First, in a step 902, the consumer selects the VIEW SHOPPING BASKET button and is presented with a list of products. In a next step, 904, the consumer, selects a product name from the list. Then, in a step 906, the consumer selects the SEE ITEM DETAILS button.

The Web browser 120 then, in a step 908, sends a local HTTP POST message directed to a local port. A port listener responds to the message in a step 910, and forwards the message to the commerce client 122 in a step 912.

In a step 914, the commerce client 122 uses a pointer to the product data structure of the selected product (this pointer is maintained following the selection of the product in connection with the VIEW SHOPPING BASKET option) to conveniently locate the product data structure of the product selected. Next, in a step 916, a drop-down box is created having the Friendly Name of a payment source (i.e., the value associated with the PaymentFriendlyName field of the product data structure) as the only entry. Similarly, in a step 918, a second drop-down box is created having the Friendly Name of a shipping address (i.e., the value associated with the AddressFriendlyName field of the product data structure) as the only entry.

A method GetFirstProperty 922 is then invoked and, in a step 920, the GetFirstProperty method, examining the contents of a property list pointer associated with the product data structure of the selected product, locates the first property data structure in a linked list of property data structures referenced by the product data structure.

Next, a method GetNextProperty 924 is repeatedly called in a step 926 to navigate the linked list of property data structures. In a step 928, a list box is created having an entry for each property name/property value pair encountered in navigating the linked list of property data structures.

In a step 930, a GetPaymentFirstFriendlyName method 932 is invoked to examine the root pointer to the linked payment source structures and to return the value of the Friendly Name of the first payment source structure. A Friendly Name, as discussed below, is simply a name like "Bob's Visa Card" which is conveniently used to designate a payment source. In the step 934, the GetPaymentNextFriendlyName method 936 is used to navigate the linked list of payment source structures, placing the Friendly Name of each in the drop-down box already created in the step 916.

In a next step 938, a GetAddressFirstFriendlyName method 940 is invoked to examine the root pointer to the linked shipping address structures and to return the value of the Friendly Name of the first shipping address structure. A Friendly Name, as used with respect to an address, is a name like "the office" or "Debbie's house" which is conveniently used to designate a shipping address. In the step 942, the GetAddressNextFriendlyName method 944 is used to navigate the linked list of shipping address structures, placing the Friendly Name of each in the drop-down box already created in the step 918.

Thus, a consumer can browse a list (displayed on the consumer's computer 102 screen as a scrollable list box) of all properties and their corresponding values associated with the selected product and can modify the property values if desired. Also, the consumer can select from either of the two drop-down boxes displayed on the consumer computer 102 to change the payment source to be used to purchase the product or to change the shipping address for delivery of the product if purchased.

In a step 946, a choice box is displayed to the consumer offering the choices OK or CANCEL. If, in the step 948, it is determined that the consumer selected CANCEL, then, in a step 950, the list box and the two drop-down boxes are cleared from the consumer computer and the steps of FIG. 9 terminate. If, however, in the step 948, the consumer selected OK, then, in a step 952, a SetItemProperty method 954 is invoked to replace the values of the properties modified by the consumer, as well as to replace the Friendly Name for payment source or shipping address if either was changed by the consumer. The SEE ITEM DETAILS option is present on the commerce client user interface as well as on Web documents.

To manage payment source information, the present invention also allows a consumer to view and modify the contents of an electronic wallet. A Web document hosts (provides to a consumer) the option VIEW WALLET and includes embedded function-calling information which invokes wallet-related functions. It will be understood that the Web browser 120 generates a HTTP POST message directed to the local consumer computer 102, and that a port listener process receives the message and passes it to the commerce client 122 and also launches (executes) the commerce client if necessary.

Figure 10:
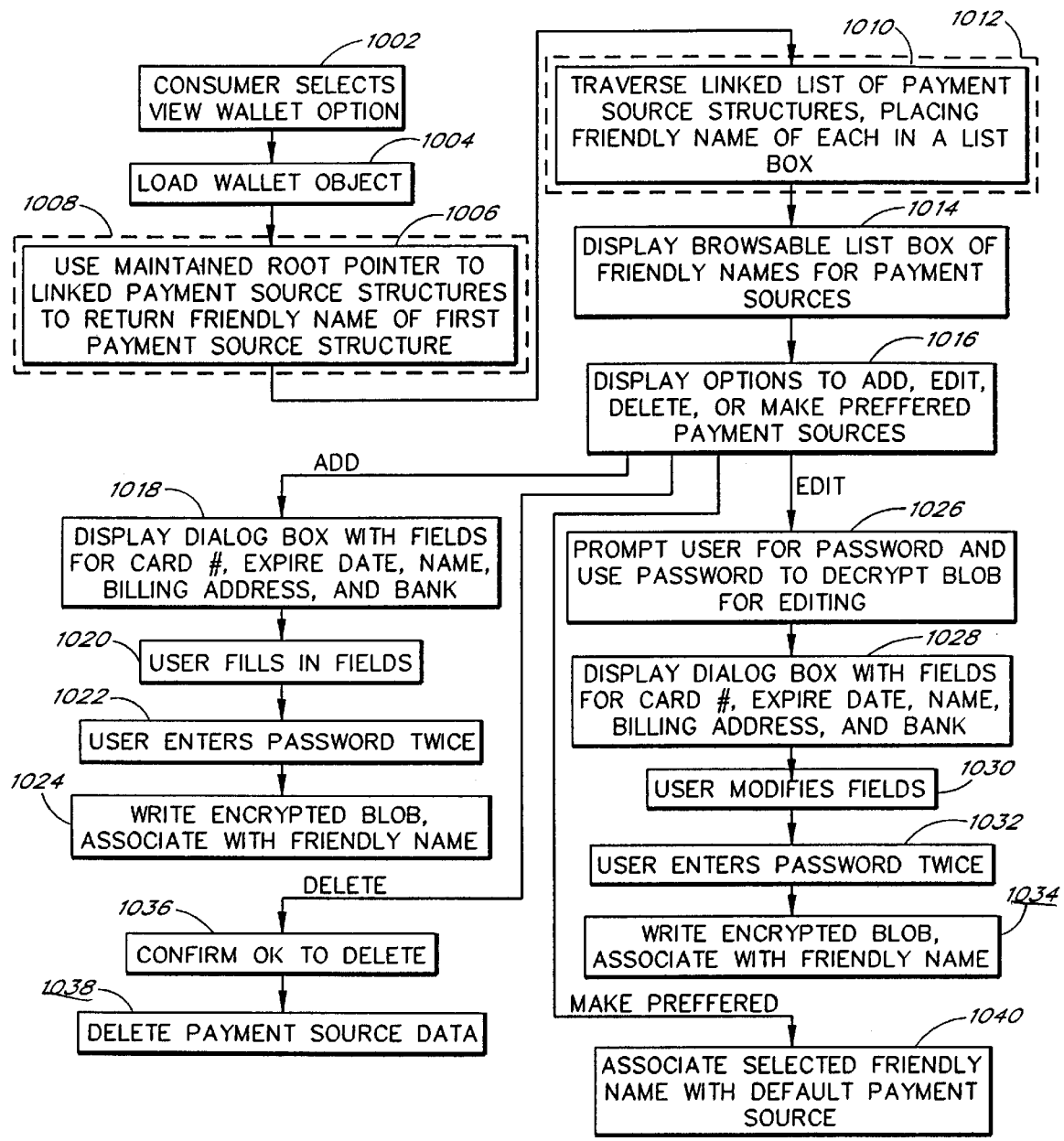
FIG. 10 illustrates the steps performed in viewing and manipulating payment source data in the wallet object on the consumer computer.

FIG. 10 illustrates the steps performed in connection with viewing and manipulating payment source data. In a first step 1002, the consumer selects the VIEW WALLET option. Next, in a step 1004, the commerce client 122, having received the function-calling information from the port listener, loads the wallet object. In a step 1006, the GetPaymentFirstFriendlyName method 1008 is invoked to examine a maintained root pointer (a pointer to the first in a linked list of payment source data structures) to determine the value of the Friendly Name associated with the first payment source data structure. This first Friendly Name is used as the first entry in a list box. Next, in a step 1010, the GetPaymentNextFriendlyName method 1012 is invoked to traverse the linked list of payment source data structures and place the Friendly Name associated with each as an entry in the list box.

In the step 1014, a browsable list box is displayed to the consumer, listing all Friendly Names assigned to payment sources. In a next step 1016, options to ADD, EDIT, DELETE payment sources are presented to the consumer, as is an option to MAKE PREFERRED (establish as the default) one of the payment sources.

If, in the step 1016, the consumer selects the ADD payment source option, then, in a step 1018, a dialog box is displayed with blank or incomplete fields corresponding to payment source information. The fields are designed to elicit information such as credit card number, issuing bank, expiration date, name on card, Friendly Name, and billing address. The consumer can enter information corresponding to a credit card, debit card, or any other cash substitute. Then, in a step 1020, the consumer fills in the fields and, if the consumer desires to retain the entered information in the electronic wallet, the user is prompted to enter a password twice for verification in a step 1022. When the passwords are typed correctly twice, then in a step 1024, the password is used to encrypt the entered payment source data, and the encrypted data is stored in association with the Friendly Name entered by the consumer which is not encrypted. The consumer can then exit from viewing the wallet or continue with further manipulations of payment source data.

If, in the step 1016, the consumer selects EDIT payment source data, then upon selecting a Friendly Name corresponding to payment source data, the consumer, in a step 1026 is prompted to enter a password. If the password is correct, it is used to decrypt the encrypted payment source information associated with the selected Friendly Name. In a step 1028, the decrypted payment source information is presented to the consumer in a dialog box. The data are broken into fields for consumer editing.

In the step 1030, the consumer modifies the data fields. When the consumer is finished updating payment source information, the consumer, in a step 1032, is prompted to enter a password twice. This password may be different from the password entered earlier to access the payment source data. When the password is successfully entered, the updated payment source data is encrypted and stored in association with the Friendly Name (which is not encrypted) 1034. Password protection at the consumer computer 102 level is an advantage of the present invention which ensures that only one person has access to credit card numbers and other financial information.

In the step 1016, the consumer may elect to DELETE payment source data. Upon selecting from the list box of step 1014 a Friendly Name corresponding to payment source data to be deleted and also selecting the DELETE payment source option, the consumer is asked, in a step 1036, to confirm the deletion request. If the consumer confirms the deletion, then payment source data associated with the selected Friendly Name is removed from the linked list of payment source data structures 1038. It will be appreciated by those skilled in the art that a password prompt can be added to the deletion steps to protect against undesired deletions.

The step 1016 also offers the option to MAKE PREFERRED one of the payment sources. Making a payment source preferred causes its Friendly Name to be associated by default with product information that is added to the electronic shopping basket. Generally, a preferred payment source would be an often used credit card account perhaps offering a very competitive interest rate or earning for the cardholder airline frequent flyer miles whenever money is spent. If the consumer, in the step 1016, selects a Friendly Name from the list box of step 1014, and then selects MAKE PREFERRED, the Friendly Name selected becomes, in the step 1040, associated with the default payment source. One of ordinary skill will understand that a confirmation check could be added to the MAKE PREFERRED steps to avoid unintended replacements of a prior default payment source. When the consumer is finished viewing and manipulating payment source data, the user terminates the VIEW WALLET options and screen display by selecting an EXIT (or similarly labeled) button.

Figure 11:
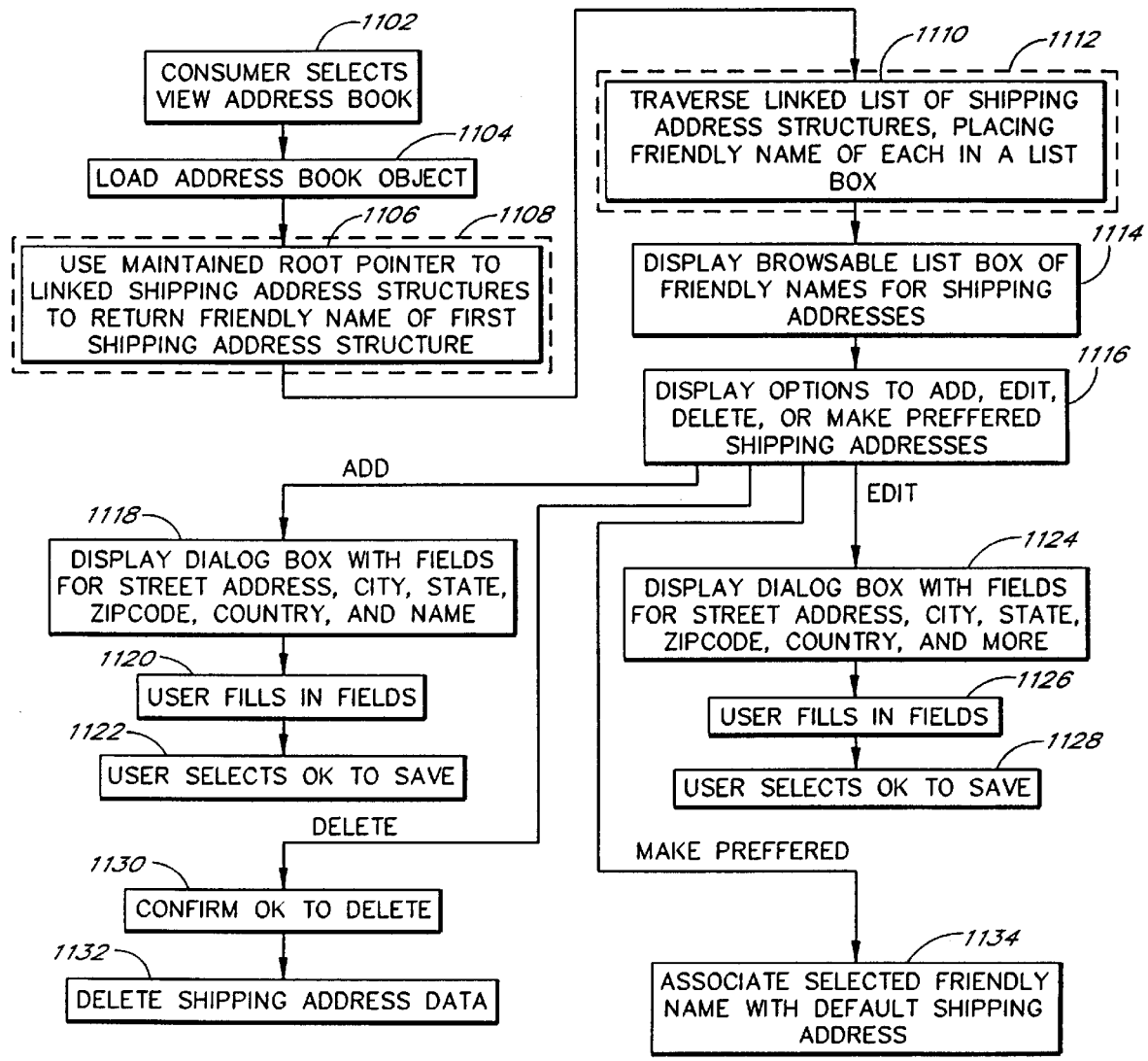
FIG. 11 illustrates the steps performed in viewing and manipulating shipping address data in the address book object on the consumer computer.

Very similar to the manner in which the present invention facilitates viewing and manipulating payment source data in the electronic wallet is the manner in which it permits consumers to view and manipulate shipping address data in the electronic address book. FIG. 11 illustrates the steps in viewing or manipulating address book data. In a first step 1102, the consumer selects a VIEW ADDRESS BOOK option. In a next step 1104, the commerce client 122 loads the address book object.

In a step 1106, the GetAddressFirstFriendlyName method 1108 uses a maintained root pointer (always points to the first of a linked list of shipping address data structures) to examine the first shipping address data structure and to return the associated Friendly Name. A Friendly Name for a shipping address might be, for example, "My Castle," or "Jill's Office." The Friendly Name associated with the first shipping address data structure is used as the first entry in a browsable list box.

Next, in a step 1110, the GetAddressNextFriendlyName method 1112, is used to traverse the linked list of shipping address data structures and to include the Friendly Name associated with each structure in the list box created in step 1106. The list box is displayed to the consumer in step 1114. A step 1116 presents options to the consumer to ADD, EDIT, DELETE shipping address data, as well as to MAKE PREFERRED a shipping address.

If, in the step 1116, the consumer elects to ADD shipping address data, then, in a step 1118, a dialog box is displayed to the consumer containing blank or incomplete fields corresponding to shipping address data such as street address, city, state, country, zip code, name, and Friendly Name. In a next step 1120, the consumer enters information into the fields. When the consumer is satisfied that the information is complete and accurate, the consumer selects the OK button in the step 1122, and the new shipping address is saved in association with the new Friendly Name entered.

As with the electronic wallet, the consumer can also elect to EDIT data in the electronic address book. Because there is not as much need for security, there is no password access to or encrypting performed on the shipping address data. One skilled in the art will understand that password-protected access could be implemented in connection with the shipping address data as specified with respect to the payment source data. If the consumer elects to EDIT shipping address data, then, after selecting a Friendly Name from the browsable list displayed in the step 1114, a dialog box is displayed in a step 1124 presenting fielded data items corresponding to the existing data associated with the selected Friendly Name. In the step 1126, the consumer modifies the existing shipping address data. When satisfied that the changes are complete, the consumer selects an OK button in a step 1128 which saves the changed shipping address information in association with the Friendly Name (which may have just been changed by the user).

If, in the step 1116, the consumer elects to DELETE shipping address data, then, after selecting a Friendly Name corresponding to a shipping address, the user is prompted in a step 1130 to confirm the delete request. If the consumer confirms the delete request in the step 1130, then in a step 1132 the shipping address data is deleted along with the Friendly Name.

If the option to MAKE PREFERRED a shipping address is selected in the step 1116, then, in a step 1134 the shipping address data associated with the selected Friendly Name is associated with the default shipping address. Thereafter, any products placed into the electronic shopping basket will acquire automatically, by default, an association with the new shipping address. One skilled in the art will appreciate that a confirmation step such as that in step 1130 with respect to deleting shipping address data could be added to safeguard against unintended modifications to the default shipping address. Note that both the VIEW WALLET and VIEW ADDRESS BOOK options are available from the commerce client user interface.

With payment source information in the electronic wallet and shipping address information in the electronic address book, the present invention enables a consumer to purchase products in the electronic shopping basket. Web documents host a READY TO BUY option.

Figure 12:
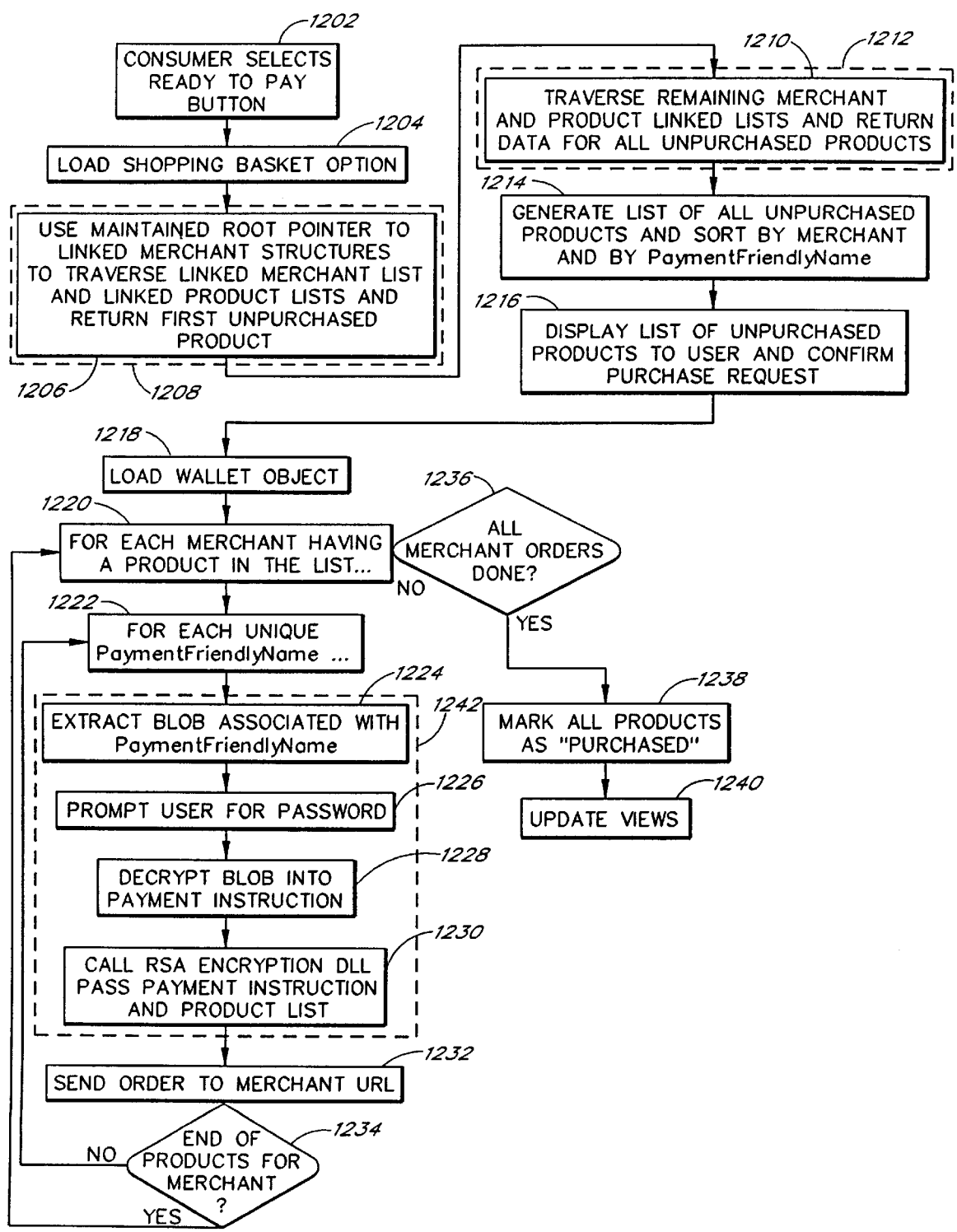
FIG. 12 illustrates the steps performed in purchasing selected products from merchant Web sites of the system over a distributed network.

FIG. 12 illustrates the steps of purchasing a product. In a first step 1202, the consumer selects the READY TO BUY option. Next, in a step 1204, the shopping basket object is loaded. Then, in a step 1206, the GetFirstItem method 1208 is used to examine a maintained root pointer to the first merchant data structure and to then traverse and examine the linked list of product data structures associated with the first merchant and return the first located unpurchased product. The Flag of each product data structure is examined to determine if the product is already purchased. If no unpurchased products are discovered in association with the first merchant data structure, the GetFirstItem moves to the next merchant structure in the linked list of merchants. The GetFirstItem method returns information (such as a pointer) identifying the first product structure associated with an unpurchased product encountered in its traversal of the merchant and product structures.

In a next step 1210, the GetNextItem method 1212 is used to complete the traversal of the merchant and product structures, returning information identifying all product structures associated with unpurchased products. In a step 1214, a list of all unpurchased products is generated and is then sorted by merchant and by PaymentFriendlyName. Next, in a step 1216, the list of unpurchased products is displayed to the consumer, and the consumer is prompted to confirm the purchase request. If, in the step 1216, the consumer confirms the purchase, then the wallet object is loaded in a step 1218. Otherwise, the steps of FIG. 12 are terminated and no purchase occurs.

With the unpurchased product items in the electronic shopping basket sorted by merchant (e.g. "L.L. Bean" or "Sears"), a step 1220 divides the product items into groups, one group per merchant. A first product group associated with a first merchant is designated for processing. A step 1222 then divides (or sorts) the first group into further subgroups according to the value of the PaymentFriendlyName (e.g., "Gold Card" or "Mary's Amex"). Thus, different orders can be submitted to one merchant, but paid for using different payment sources.

One having ordinary skill in the art will appreciate that a third subgrouping could be performed such as, for example, a subgrouping based on the value of AddressFriendlyName (e.g., "Grandma's House" or "Alaska Cabin"). Such an additional subgrouping would conveniently support orders which could be submitted to one merchant, cause payment from different payment sources and assist the merchant in shipping products to different locations. Further, products paid for from the same payment source could conveniently be shipped to different addresses.

Associating a group of products for a single merchant that are to be purchased from a single payment source, a GSO (goods and services order) is submitted to the GenerateGSOPI method 1242 on the wallet object. In a step 1224, the GenerateGSOPI method 1242 extracts the stored and encrypted data (or blob) associated with the passed PaymentFriendlyName. In a next step, 1226, the consumer is prompted for a password to authorize payment from the payment source associated with the passed PaymentFriendlyName. If the password is incorrect, the purchase is not authorized and the next subgroup of products is identified whereupon step 1222 repeats. If, however, the password is correct, then the encrypted payment source data is decrypted in a step 1228, and a payment instruction is formed from the payment source information and the product information. The payment instruction contains data sufficient to allow a merchant to complete the order. In a next step, 1230, the payment instruction along with the product list is passed to an encryption DLL to be encrypted. The encryption DLL uses RSA encryption technology (a form of public/private key encryption) which is known. The present invention is not limited by encryption technology, and other forms of encryption could be used. The GenerateGSOPI method 1242 then passes the encrypted order to a step 1232 wherein the order is sent to a merchant's order URL (held as a field associated with a product data structure) as part of an HTTP POST message. Thus, the commerce client 122 is able to bypass the Web browser and transmit HTTP POST messages itself.

After transmitting an order, the commerce client 122 then updates the in memory structure for the respective merchant. Each merchant structure includes a reference pointer to a linked list of order structures. The commerce client 122 traverses the linked list of order structures, if any, to reach the final order structure. The commerce client 122 allocates memory for a new order structure, links the new structure to the list of order structures for the merchant, and then populates the new order structure with payment information, shipping address information, and a pointer to the product structure associated with the product ordered. An order tracking identifier ("OTI") field of the new order structure is left blank. One skilled in the art will appreciate that linked lists of structures is merely one way of associating data items together, and that other methods such as relational databases can be used to accomplish a similar association.

A merchant site receiving a product purchase order transmits an order confirmation message to a Web browser 120. The order confirmation message transmits an order tracking identifier ("OTI") to the Web browser 120. The Web browser 120 displays the OTI on the screen of the user computer, along with a message which states, for example, "Thank you for your order. If there is any problem, please phone 1 800 123 4567 and be prepared to refer to the following order tracking identifier." The OTI is also embedded in a MIME message of type x-ishopper which is passed by the Web browser 120 to the commerce client 122. The commerce client 122 then copies the OTI to the blank OTI field of the order structure, thus completing the storage of information related to the purchase.

A step 1234 determines whether additional products for the current merchant remain to be purchased. If so, processing resumes at the step 1222, and, if not, processing resumes upon the next group of products from the next merchant at the step 1220. A step 1236 determines whether all products for all merchants have been purchased. If not, then processing resumes with the step 1220. If all products have been purchased as determined by the step 1236, then the Flag field for every product in the electronic shopping basket is marked "purchased" (i.e., set equal to 1). Finally, in a step 1240, the steps comprising the VIEW SHOPPING BASKET option and the VIEW HISTORY option are invoked to force updates to memory structures and screen displays to avoid confusion as to whether any product was in fact purchased.

An ORDER STATUS option is presented to a user by the commerce client 122 after selection of the VIEW HISTORY option. Once a list of orders is generated and displayed to the user as described above, the user selects an order (preferably by positioning a mouse pointer over information associated with an order and clicking a mouse button). The user then selects the ORDER STATUS option. The commerce client then generates an HTTP POST message containing the order tracking identifier ("OTI"), and transmits the HTTP POST message to the order URL (uniquely identifying the Internet address of the selling merchant) associated with the product (or products) purchased. A merchant site receiving an HTTP POST message which includes an OTI determines the status of the order (e.g., "SHIPPED," "CANCELED," "WAITING FOR INVENTORY," etc.). The merchant site transmits an HTML document to the Web browser which includes the status information. The Web browser of the user computer displays the status information on the screen of the user computer.

A consumer receives on-line assistance (or help) in using a computer-based shopping system by selecting a HELP option. In one embodiment, the HELP option is included in the HTML coding of a Web document and displayed to the user by a Web browser. Selecting the HELP option causes the Web browser 120 to access a HELP Web site.

In another embodiment, the HELP option is displayed to the user by the user interface of the commerce client 122. Selecting the HELP option in this embodiment causes the commerce client 122 to establish a TCP/IP communication link to another computer if such a link is not already established. The commerce client 122 transmits an HTTP POST message directly to a HELP Web site. The commerce client 122 causes the Web browser 120 to begin running on the user computer if it is not already running.

In either embodiment of the HELP option, the Web browser displays help information included in documents served by a Web server of the HELP Web site. The help information, for example, describes the use of the computer-based shopping system or the cause of errors encountered in operating the computer-based shopping system, offers tips, or illustrates features of the computer-based shopping system with pictures and diagrams. One skilled in the art will appreciate that on-line help could alternatively be made available to consumers via a hierarchically ordered (topics, subtopics, and sub-subtopics) collection of information residing on the consumer computer 102.

A consumer conveniently accesses a merchant Web site 302 from which product information has been obtained by selecting the JUMP TO MERCHANT option. The user interface of the commerce client includes the JUMP TO MERCHANT option. By maintaining an association between a product name and a merchant Web site URL within the product data structure of every product, a computer-based shopping system locates a URL associated with the merchant selling a product by accessing the product data structure for the product. The commerce client 122 generates an HTTP POST message accessing the merchant Web site associated with the product. The merchant Web site responds by transmitting an HTML document to the Web browser 120. Thus, the consumer conveniently accesses the Web site from which information about a product was obtained.

A consumer terminates a computer-based shopping system by selecting an EXIT button. The EXIT button causes the commerce client 122 to write linked in-memory data structures to a hard disk (other storage devices can suffice) in a manner which preserves the link relationships. The commerce client 122 then stops executing on the consumer computer 102.

This invention may be embodied in other specific forms without departing from the essential characteristics as described herein. The embodiments described above are to be considered in all respects as illustrative only and not restrictive in any manner. The scope of the invention is indicated by the following claims rather than by the foregoing description. Any and all changes which come within the meaning and range of equivalency of the claims are to be considered within their scope.

In the claims which follow, alphabetic characters used to designate claim steps are provided for convenience of description only, and are not intended to imply any particular order for performing the steps.

What is claimed is:

1. A client architecture for conducting electronic commerce over the Internet, comprising, on a computer-readable medium:

a Web browser configured to run on a computer;

a commerce client application configured to run on the computer in conjunction with the Web browser application to provide a user interface, the commerce client application including a callable function, said callable function comprising executable computer instructions stored on a computer storage medium accessible by the computer;

an electronic shopping basket object configured to access and manipulate product information and merchant information stored on the computer storage medium, the access and manipulation initiated by executing the callable function of the commerce client application;

at least two Web documents, each of which includes embedded function-calling information that corresponds to the callable function of the commerce client application, the function-calling information embedded within the Web document such that a user can selectively initiate the execution of the callable function via the user interface while viewing one of the Web documents with the Web browser; and wherein the user interface is displayed for each of the Web documents and functions independently of the Web documents.

2. The client architecture according to claim 1, wherein the commerce client application includes a second callable function, and wherein each Web document includes embedded function-calling information that corresponds to the second callable function of the commerce client application, the execution of the second callable function selectively initiated by the user while viewing one of the Web documents with the Web browser, the client architecture further comprising, on the computer-readable medium:

an electronic wallet function configured to access and manipulate payment source information stored on the computer storage medium, the access and manipulation of the payment source information initiated by executing the second callable function of the commerce client application.

3. The client architecture according to claim 1, wherein the commerce client application includes a second callable function, and wherein each Web document includes embedded function-calling information that corresponds to the second callable function of the commerce client application, the execution of the second callable function selectively initiated by the user while viewing one of the Web documents with the Web browser, the client architecture further comprising, on the computer-readable medium:

an electronic address book function configured to access and manipulate shipping address information stored on the computer storage medium, the access and manipulation of the shipping address information initiated by executing the second callable function of the commerce client application.

4. A client architecture for conducting electronic commerce over the Internet, comprising, on a computer-readable medium:

a Web browser configured to run on a computer;

a commerce client application configured to run on the computer in conjunction with the Web browser application, the commerce client application including a callable function and a user interface;

an electronic shopping basket function configured to store product information and merchant information to a computer storage medium accessible by the computer, said electronic shopping basket function comprising executable computer instructions stored on a computer storage medium accessible by the computer, the product information and merchant information retrieved from merchant Web sites over the Internet via the Web browser, the storing initiated by executing the callable function of the commerce client application;

at least two Web documents, each of which includes embedded function-calling information that corresponds to the callable function of the commerce client application, the function-calling information embedded within the Web document such that a user can selectively initiate the execution of the callable function via the user interface while viewing one of the Web documents with the Web browser; and wherein the user interface is displayed for each of the Web documents and functions independently of the Web documents.

5. A client architecture for conducting electronic commerce over the Internet, comprising, on a computer-readable medium:

a Web browser configured to run on a computer;

a commerce client application configured to run on the computer in conjunction with the Web browser application, the commerce client application including a callable function and a user interface;

an electronic shopping basket function configured to store product information and merchant information to a computer storage medium accessible by the computer, said electronic shopping basket function comprising executable computer instructions stored on a computer storage medium accessible by the computer, the product information and merchant information obtained from merchant Web sites over the Internet via the Web browser, the retrieval initiated by executing the callable function of the commerce client application;

at least two Web documents, each of which includes embedded function-calling information that corresponds to the callable function of the commerce client application, the function-calling information embedded within the Web document such that a user can selectively initiate the execution of the callable function via the user interface while viewing one of the Web documents with the Web browser; and wherein the user interface is displayed for each of the Web documents and functions independently of the Web documents.

6. A client architecture for purchasing products over the Internet, comprising, on a computer-readable medium:

a commerce client application configured to run on a computer and having a user interface, the commerce client application configured to transmit information to a World Wide Web site in accordance with World Wide Web protocols, the commerce client application configured to run in conjunction with a Web browser, the commerce client application including a product purchase function which combines product information, merchant information, and payment source information and transmits the combined information to a World Wide Web site, the product purchase function comprising executable computer instructions stored on the computer-readable medium;

a Web browser configured to run on the computer; and at least two Web documents, each of which includes embedded function-calling information that corresponds to the product purchase function of the commerce client application, the function-calling information embedded within the Web document such that a user can selectively initiate the execution of the product purchase function via the user interface while viewing one of the Web documents with the Web browser; and wherein the user interface is displayed for each of the Web documents and functions independently of the Web documents.

7. The client architecture according to claim 6, further comprising, on the computer-readable medium;

an electronic shopping basket object configured to access and manipulate product information and merchant information stored on a computer storage medium, the electronic shopping basket function transmitting product information and merchant information to the commerce client application during execution of the product purchase function of the commerce client application, the electronic shopping basket object comprising executable computer instructions stored on the compute-readable medium.

8. The client architecture according to claim 6, further comprising, on the computer-readable medium;

an electronic wallet object configured to access and manipulate payment source information and merchant information stored on a computer storage medium, the electronic wallet object transmitting payment source information and merchant information to the commerce client application during execution of the product purchase function of the commerce client application, the electronic wallet object comprising executable computer instructions stored on the compute-readable medium.

9. A method for gathering product information over a distributed network, comprising:

(a) receiving a first hypertext document over the distributed network at a user computer, the first hypertext document comprising (I) a description of a first product, (ii) a user-selectable product gathering option, and (iii) function-calling information associated with the product gathering option;

(b) displaying the first hypertext document to a user via a user interface on the user computer and monitoring user input for selection of the product gathering option;

(c) responding to user selection of the product gathering option by passing at least a portion of the function-calling information from a Web browser to a local process running on the user computer, the local process calling an executable function specified by the function-calling information, the function storing the description of the first product to a local data storage area of the user computer;

(d) receiving a second hypertext document from a second site over the distributed network at the user computer, the second hypertext document comprising (i) a description of a second product, (ii) a second selectable product gathering option, and (iii) function-calling information associated with the second product gathering option;

(e) displaying the second hypertext document to the user via the user interface of the user computer and monitoring user input for selection of the second product gathering option; and (f) responding to user selection of the second product gathering option by calling a second executable function, the second function storing the description of the second product to the local data storage area.

10. The method according to claim 9 wherein step (a) comprises sending an HTML document over the distributed network from a Web server running on a merchant Web site to a Web browser running on the user computer, the Web server in a location remote to the Web browser.

11. The method according to claim 9, further comprising the steps of:

(g) displaying a product comparison option to the user via the user computer and monitoring user input for selection of the product comparison option; and (h) responding to user selection of the product comparison option by retrieving from the local storage the description of the first product and the description of the second product, and by formatting the descriptions and displaying the descriptions to the user via the user computer.

12. A method for using a Web browser to manage local data, the Web browser running on a user computer, the local data stored on a computer storage medium accessible by the user computer, the method comprising the steps of:

(a) receiving with the Web browser a first HTML document and a second HTML document, each HTML document comprising a user-selectable view option and function-calling information associated with the view option;

(b) displaying the first HTML document and the user-selectable view option to a user via a user interface on the user computer;

(c) monitoring user input for selection of the view option;

(d) responding to selection of the view option by calling a view function specified in the function-calling information, the view function comprising executable computer instructions accessible by the computer, the view function accessing and formatting the local data and displaying the local data to the user;

(e) displaying the second HTML document and the user-selectable view option to the user via the user interface;

(f) monitoring user input for selection of the view option; and (g) responding to selection of the view option by calling a view function specified in the function-calling information, the view function comprising executable computer instructions accessible by the computer, the view function accessing and formatting the local data and displaying the local data to the user.

13. A method according to claim 12 wherein the calling of the view function of step (d) is performed by sending a message which includes at least a portion of the function-calling information from the Web browser to a local Internet address representing the user computer, a local port-monitoring process monitoring the local Internet address and receiving the message, the local process using the function-calling information to make the function call.

14. A method according to claim 12 wherein the calling of the view function of step (d) is performed by sending a message which includes at least a portion of the function-calling information from the Web browser to a local Internet address representing the user computer, a first local process monitoring the local Internet address and receiving the message, the first local process invoking a second local process if it is not already running, the first local process passing at least the function-calling information to the second local process, the second local process using the function-calling information to call the view function.

15. A method according to claim 12 wherein the view function further comprises displaying an add option to the user via the user interface, the method further comprising the steps of:

(e) monitoring user input for selection of the add option;

(f) responding to selection of the add option by prompting the user to enter additional local data;

(g) monitoring user input for entry of additional local data; and (h) responding to entry of additional local data by storing the additional local data on the computer storage medium.

16. A method according to claim 12 wherein the view function further comprises displaying an edit option to the user via the user interface, the method further comprising the steps of:

(e) monitoring user input for selection of the edit option;

(f) responding to selection of the edit option by prompting the user to select displayed local data;

(g) monitoring user input for selection of displayed local data; and (h) responding to selection of displayed local data by presenting the selected local data to the user for editing via the user computer and by displaying a done option;

(i) applying edit operations performed by the user via the user computer to the selected local data to generate edited local data;

(j) monitoring user input for selection of the done option; and (k) responding to selection of the done option by removing the selected local data from the computer storage medium and by storing the edited local data on the computer storage medium.

17. A method according to claim 12 wherein the view function further comprises displaying a delete option to the user via the user interface, the method further comprising the steps of:

(e) monitoring user input for selection of the delete option;

(f) responding to selection of the delete option by prompting the user to select displayed local data;

(g) monitoring user input for selection of displayed local data; and (h) responding to entry of displayed local data by removing the selected local data from the computer storage medium.

18. A method according to claim 12 wherein the local data represent at least one source of credit or source of funds.

19. A method according to claim 12 wherein the local data represent at least one postal address.

20. A method, comprising the following steps:

accessing a first merchant site from a user computer via a user interface on the user computer;

gathering first product information from the first merchant site;

storing the first product information locally on the user computer;

accessing a second merchant site from the user computer via the user interface;

gathering second product information from the second merchant site;

storing the second product information locally on the user computer; and concurrently analyzing the first product information and the second product information at the user computer.

21. A method as recited in claim 20, wherein the concurrently analyzing step comprises the step of analyzing the first product information and the second product information offline at the user computer.

22. A method as recited in claim 20, further comprising the step of displaying the first product information and the second product information concurrently to a user.

23. A method as recited in claim 20, further comprising the step of storing first and second ordering information for ordering products from the first merchant site and from the second merchant site.

24. A method as recited in claim 23, further comprising the step of selectively transmitting the first ordering information to the first merchant site and selectively transmitting the second ordering information to the second merchant site.

25. A method as recited in claim 24, further comprising the step of selectively tracking status of the first ordering information and selectively tracking status of the second ordering information.

* * * * *

UNITED STATES PATENT AND TRADEMARK OFFICE
CERTIFICATE OF CORRECTION

PATENT NO. : 6,125,352
DATED : September 26, 2000
INVENTOR(S) : D. Chase Franklin et al.

It is certified that error appears in the above-identified patent and that said Letters Patent is hereby corrected as shown below:

Column 8,
Line 21, change "con" to -- coin --.

Column 32,
Line 53, change "(I)" to -- ( i) --.

Signed and Sealed this

Twenty-fifth Day of September, 2001

*Attest:*

*Attesting Officer*

NICHOLAS P. GODICI
*Acting Director of the United States Patent and Trademark Office*